(12) United States Patent
Moshir et al.

(10) Patent No.: US 7,823,147 B2
(45) Date of Patent: Oct. 26, 2010

(54) NON-INVASIVE AUTOMATIC OFFSITE PATCH FINGERPRINTING AND UPDATING SYSTEM AND METHOD

(75) Inventors: Sean Moshir, Scottsdale, AZ (US); Christopher A. H. Andrew, Chandler, AZ (US); Jack Lee Hudler, Allen, TX (US); Leon Li, Mesa, AZ (US); Jonathan M. Gordon, Mesa, AZ (US); Michael Bacon, Scottsdale, AZ (US); Noah Williams, Scottsdale, AZ (US); Jonathan Lane, Reno, NV (US); James J. Horton, Gilbert, AZ (US); Dan Ferguson, Orem, UT (US)

(73) Assignee: Lumension Security, Inc., Scottsdale, AZ (US)

( * ) Notice: Subject to any disclaimer, the term of this patent is extended or adjusted under 35 U.S.C. 154(b) by 1225 days.

(21) Appl. No.: 11/160,439

(22) Filed: Jun. 23, 2005
(Under 37 CFR 1.47)

(65) Prior Publication Data
US 2005/0257214 A1 Nov. 17, 2005

Related U.S. Application Data

(63) Continuation of application No. 09/957,673, filed on Sep. 20, 2001, now Pat. No. 6,990,660.

(60) Provisional application No. 60/234,680, filed on Sep. 22, 2000.

(51) Int. Cl.
*G06F 9/44* (2006.01)
*G06F 15/177* (2006.01)

(52) U.S. Cl. ............... 717/173; 717/169; 717/175; 717/178; 709/221

(58) Field of Classification Search ............ None
See application file for complete search history.

(56) References Cited

U.S. PATENT DOCUMENTS 4,954,941 A 9/1990 Redman (Continued)

FOREIGN PATENT DOCUMENTS

EP 0811942 10/1997

(Continued)

OTHER PUBLICATIONS

Liu, et al., "Automated Security Checking and Patching Using TestTalk" IEEE Comp.Science, US, Sep. 11, 2000, pp. 261-264.

(Continued)

*Primary Examiner*—Michael J Yigdall
(74) *Attorney, Agent, or Firm*—Greenberg Traurig, LLP

(57) ABSTRACT

Methods, systems, and configured storage media are provided for discovering software updates, discovering if a given computer can use the software update, and then updating the computers with the software as needed automatically across a network without storing the updates on an intermediate machine within the network. Furthermore, when a failure is detected, the rollout is stopped and the software can be automatically removed from those computers that already were updated. The software update can be stored originally at an address that is inaccessible through the network firewall by intermediately uploading the software update to an update computer which is not a part of the network but has access through the firewall, which is then used to distribute the update.

6 Claims, 8 Drawing Sheets

U.S. PATENT DOCUMENTS

| | | | |
|---|---|---|---|
| 4,999,806 A | 3/1991 | Chernow et al. | 717/177 |
| 5,341,477 A | 8/1994 | Pitkin et al. | 709/226 |
| 5,581,764 A | 12/1996 | Fitzgerald et al. | 709/223 |
| 5,586,304 A | 12/1996 | Stupek, Jr. et al. | 717/170 |
| 5,649,187 A | 7/1997 | Hornbuckle | |
| 5,699,275 A | 12/1997 | Beasley et al. | |
| 5,742,829 A | 4/1998 | Davis et al. | 717/178 |
| 5,752,042 A | 5/1998 | Cole et al. | 717/173 |
| 5,764,913 A | 6/1998 | Jancke et al. | 709/224 |
| 5,771,347 A | 6/1998 | Grantz et al. | |
| 5,787,246 A | 7/1998 | Lichtman et al. | 709/220 |
| 5,794,254 A | 8/1998 | McClain | 707/204 |
| 5,799,002 A | 8/1998 | Krishnan | 370/234 |
| 5,805,897 A | 9/1998 | Glowny | |
| 5,809,329 A | 9/1998 | Lichtman et al. | 710/8 |
| 5,845,090 A * | 12/1998 | Collins et al. | 709/221 |
| 5,852,812 A | 12/1998 | Reeder | 705/39 |
| 5,854,794 A | 12/1998 | Pawlowski | 370/509 |
| 5,860,012 A | 1/1999 | Luu | |
| 5,909,581 A | 6/1999 | Park | 717/170 |
| 5,919,247 A | 7/1999 | Van Hoff et al. | 709/217 |
| 5,930,511 A | 7/1999 | Hinsley | 717/164 |
| 5,933,646 A | 8/1999 | Hendrickson et al. | 717/169 |
| 5,933,647 A | 8/1999 | Aronberg et al. | 717/178 |
| 5,933,826 A | 8/1999 | Ferguson | 707/9 |
| 5,974,454 A | 10/1999 | Apfel et al. | 709/221 |
| 5,991,802 A | 11/1999 | Allard et al. | 709/219 |
| 5,999,740 A * | 12/1999 | Rowley | 717/173 |
| 6,006,329 A | 12/1999 | Chi | |
| 6,016,499 A | 1/2000 | Ferguson | 707/104.1 |
| 6,029,247 A | 2/2000 | Ferguson | 726/5 |
| 6,049,671 A | 4/2000 | Slivka et al. | 717/173 |
| 6,052,710 A | 4/2000 | Saliba et al. | 709/203 |
| 6,061,740 A | 5/2000 | Ferguson et al. | 709/246 |
| 6,073,214 A | 6/2000 | Fawcett | |
| 6,078,945 A | 6/2000 | Hinsley | 718/105 |
| 6,094,679 A | 7/2000 | Teng et al. | 709/220 |
| 6,108,649 A | 8/2000 | Young et al. | 707/4 |
| 6,138,157 A | 10/2000 | Welter et al. | 709/224 |
| 6,151,643 A | 11/2000 | Cheng et al. | |
| 6,151,708 A | 11/2000 | Pedrizetti et al. | 717/173 |
| 6,157,618 A | 12/2000 | Boss et al. | 370/252 |
| 6,161,218 A | 12/2000 | Taylor | 717/174 |
| 6,199,204 B1 | 3/2001 | Donohue | 717/178 |
| 6,202,207 B1 | 3/2001 | Donohue | |
| 6,216,175 B1 | 4/2001 | Sliger et al. | 717/169 |
| 6,219,675 B1 | 4/2001 | Pal et al. | 707/201 |
| 6,243,766 B1 | 6/2001 | Sliger et al. | 710/2 |
| 6,256,664 B1 | 7/2001 | Donoho et al. | |
| 6,256,668 B1 | 7/2001 | Slivka et al. | 709/220 |
| 6,263,362 B1 | 7/2001 | Donoho et al. | |
| 6,269,456 B1 | 7/2001 | Hodges et al. | |
| 6,272,677 B1 | 8/2001 | Lam et al. | 717/170 |
| 6,279,156 B1 | 8/2001 | Amberg et al. | 717/124 |
| 6,281,790 B1 | 8/2001 | Kimmel et al. | 340/506 |
| 6,282,175 B1 | 8/2001 | Steele et al. | 370/254 |
| 6,282,709 B1 | 8/2001 | Reha et al. | 717/175 |
| 6,282,712 B1 | 8/2001 | Davis et al. | 717/170 |
| 6,289,378 B1 | 9/2001 | Meyer et al. | 709/223 |
| 6,292,889 B1 | 9/2001 | Fitzgerald et al. | 713/1 |
| 6,307,841 B1 | 10/2001 | Rowles et al. | 370/252 |
| 6,324,690 B1 | 11/2001 | Luu | 717/177 |
| 6,356,936 B1 | 3/2002 | Donoho et al. | |
| 6,493,871 B1 | 12/2002 | McGuire et al. | 717/173 |
| 6,557,054 B2 | 4/2003 | Reisman | 710/33 |
| 6,604,130 B2 | 8/2003 | Donoho et al. | |
| 6,718,549 B1 * | 4/2004 | Narin et al. | 717/178 |
| 6,721,713 B1 | 4/2004 | Guheen et al. | |
| 6,725,377 B1 * | 4/2004 | Kouznetsov | 726/23 |
| 6,763,517 B2 | 7/2004 | Hines | |
| 6,801,929 B1 | 10/2004 | Donoho et al. | |
| 6,832,373 B2 | 12/2004 | O'Neill | |
| 6,879,979 B2 | 4/2005 | Hindawi et al. | |
| 6,931,434 B1 | 8/2005 | Donoho et al. | |
| 2002/0032768 A1 * | 3/2002 | Voskuil | 709/224 |
| 2002/0112200 A1 | 8/2002 | Hines | |
| 2002/0116665 A1 | 8/2002 | Pickover et al. | |
| 2002/0174422 A1 | 11/2002 | Kelley et al. | 717/178 |
| 2004/0064722 A1 | 4/2004 | Neelay et al. | |
| 2004/0205709 A1 | 10/2004 | Hiltgen et al. | |
| 2004/0210653 A1 | 10/2004 | Kanoor et al. | |
| 2006/0047942 A1 | 3/2006 | Rothman et al. | |

FOREIGN PATENT DOCUMENTS

| | | |
|---|---|---|
| EP | 0 811 942 | 12/1997 |
| EP | 0811942 | 12/1997 |
| WO | WO 94/25913 | 11/1994 |
| WO | WO9425913 | 11/1994 |
| WO | WO9534857 | 12/1995 |
| WO | WO02041147 | 5/2002 |

OTHER PUBLICATIONS

Co-owned U.S. Appl. No. 10/394,447.
Response to Non-Final Office Action in U.S. Appl. No. 10/394,447 (Jul. 15, 2008).
Request for Continued Examination in U.S. Appl. No. 10/394,447 (Jan. 15, 2008).
Final Office Action in U.S. Appl. No. 10/394,447 (Oct. 15, 2007).
Response in U.S. Appl. No. 10/394,447 (Jul. 25, 2007).
Non-Final Office Action in U.S. Appl. No. 10/394,447 (Jan. 25, 2007).
Request for Continued Examination in U.S. Appl. No. 10/394,447 (Nov. 13, 2006).
Final Office Action in 10/394,447 (Jul. 13, 2006).
Response in U.S. Appl. No. 10/394,447 (Apr. 3, 2006).
Non-Final Office Action in U.S. Appl. No. 10/394,447 (Dec. 2, 2005).
Response in U.S. Appl. No. 10/394,447 (Sep. 6, 2005).
Final Office Action in U.S. Appl. No. 10/394,447 (Jun. 6, 2005).
Response in U.S. Appl. No. 10/394,447 (Feb. 2, 2005).
Non-Final Office Action in U.S. Appl. No. 10/394,447 (Nov. 3, 2004).
Co-owned U.S. Appl. No. 11/160,439.
Request for Reexamination of related U.S. Patent No. 6,990,660, filed Feb. 28, 2007.
Order granting reexamination of U.S. Patent No. 6,990,660, mailed Apr. 12, 2007.
Request for Reexamination of related U.S. Patent No. 6,990,660, filed Sep. 26, 2007.
Order granting reexamination of U.S. Patent No. 6,990,660, mailed Nov. 5, 2007.
Decision sua sponte merging reexamination proceedings, mailed Jan. 22, 2008.
Office Action in merged reexamination proceedings relating to U.S. Patent No. 6,990,660, mailed Feb. 8, 2008.
Response to office action in reexamination proceedings relating to U.S. Patent No. 6,990,660 filed Apr. 8, 2008.
Supplemental European Search Report from corresponding European Patent Application No. 04716490.0.
Complaint and Demand for Jury Trial, *PatchLink Corp. v. Shavlik Tech.*, No. CV07-0021-PHX-JWS (Jan. 4, 2007).
Answer and Demand for Jury Trial, *PatchLink Corp. v. Shavlik Tech.*, No. CV07-0021-PHX-JWS (Mar. 13, 2007).
Amended Answer and Counterclaims and Demand for Jury Trial, *PatchLink Corp. v. Shavlik Tech.*, No. CV07-0021-PHX-JWS (Mar. 21, 2007).
Motion for Summary Judgment, *PatchLink Corp. v. Shavlik Tech.*, No. CV07-0021-PHX-JWS (Mar. 22, 2007).
Memorandum in Support of its Motion for Summary Judgment, *PatchLink Corp. v. Shavlik Tech.*, No. CV07-0021-PHX-JWS (Mar. 22, 2007).

Statement of Material Facts in Support of Defendant Shavlik Technologies, LLC.'s Motion for Summary Judgment, *PatchLink Corp.* v. *Shavlik Tech.*, No. CV07-0021-PHX-JWS (Mar. 22, 2007).
List of Exhibits to the Statement of Material Facts in Support of Defendant Shavlik Technologies, LLC.'s Motion For Summary Judgment, *PatchLink Corp.* v. *Shavlik Tech.*, No. CV07-0021-PHX-JWS (Mar. 22, 2007).
Response to Shavlik's Statement of Facts Including Declarations of Christopher A.H. Andrew and Shahpar Shahpar, *PatchLink Corp.* v. *Shavlik Tech.*, No. CV07-0021-PHX-JWS (Apr. 26, 2007).
Opposition to Defendant's Motion for Summary Judgment of Patent Unenforceability, *PatchLink Corp.* v. *Shavlik Tech.*, No. CV07-0021-PHX-JWS (Apr. 26, 2007).
Defendant Shavlik Technologies, LLC.'s Reply in Support of Its Motion for Summary Judgment, *PatchLink Corp.* v. *Shavlik Tech.*, No. CV07-0021-PHX-JWS (May 14, 2007).
Defendant Shavlik Technologies, LLC.'s Notice of Supplemental Authority in Support of Its Motion for Summary Judgment, *PatchLink Corp.* v. *Shavlik Tech.*, No. CV07-0021-PHX-JWS (May 24, 2007).
Patchlink Corporation's Response to Shavlik Technologie's Motion for Leave to File Its Notice of Supplemental Authority in Support of Its Motion for Summary Judgment, *PatchLink Corp.* v. *Shavlik Tech.*, No. CV07-0021-PHX-JWS (Jun. 11, 2007).
Order and Opinion,. *PatchLink Corp.* v. *Shavlik Tech.*, No. CV07-0021-PHX-JWS (Aug. 14, 2007).
Joint Status Report, *PatchLink Corp.* v. *Shavlik Tech.*, No. CV07-0021-PHX-JWS (Dec. 3, 2007).
Joint Status Report, *PatchLink Corp.* v. *Shavlik Tech.*, No. CV07-0021-PHX-JWS (Apr. 11, 2008).
Joint Status Report, *PatchLink Corp.* v. *Shavlik Tech.*, No. CV07-0021-PHX-JWS (Jun. 30, 2008).
ActiveWatch: Hosted Web Performance Monitoring Service; copyright date 2000.
Ahead of the Service Pack, from www.networkcomputing.co.uk web site via link in #A1; Nov. 2000.
Anderson, Rick, "The End of DLL Hell"—Jan. 2000.
ASPs: Leasing software; copyright date 2000-2001.
Bartoletti et al., "Secure Software Distribution System", Prepared for submission to the National Information Systems Security Conference held in Baltimore, MD, Oct. 6-7, 1997.
Benefits of Software Leasing; Dec. 15, 1998.
Bumback, "Patching up bad patches", from www.zdnet.com; Nov. 22, 2002.
Chang et al., Automated Security Checking and Patching Using TestTalk, IEEE Comput.Soc., U.S., pp. 261-264, (Sep. 11, 2000).
Computer Associates ManageIT news release; May 8, 2000.
Coopee, "Building a strong foundation", Network World Fusion, Jan. 31, 2000.
Download Center—UpdateEXPERT Provides Patch Management & Remediation, www.stbernard.com, pp. 1-2.
Fonseca, B., "Web performance tool gets upgrade"; Aug. 29, 2000.
Freshwater Software news release; Jan. 18, 1998.
HFNetChk, pp. 1-21; copyright date 2001.
InfraDesk.TM. page; Dec. 21, 2000.
Kearns, D., "Patch tracking"; Jun. 27, 2001.
Leasing Software; no later than Feb. 27, 2001.
Marimba Castanet; copyright 2000.
Mueller, "PatchLink Helps Keep Windows Closed", from www.networkcomputing.com; Sep. 2, 2002.
NetworkDeltaWeb page; copyright date 2000.
Newly Released PatchLink Update 4.0., from biz.yahoo.com; Oct. 14, 2002.
Norton Ghost™ Implementation Guide, Symantec, Corp., (copyright 1999).
Novell ZENworks Grows Up; Feb. 7, 2000.
Pages numbered as 1-27, from www.bigfix.com; no later than Nov. 25, 2002.
PatchLink Menu: Gravitix Overview; copyright date 2001.
PatchLink Press Release; Jun. 18, 2001.
Patchlink News Release—Jun. 6, 2000 "Patchlink.com to Provide Web-based . . . ".

Patchlink News Release—Mar. 27, 2000—"Patchlink.com launches WebConsole . . . ".
Patchlink News Release—Mar. 27, 2000—"Patchlink.com Releases Gravitix . . . ".
Patchlink News Release—May 10, 1999—"HiTecSoft to Release Beta . . . ".
Patchlink News Release—Nov. 16, 1998—"WebConsole 4.0 Unifies . . . ".
PatchLink Update.TM. 4.0 White Paper: Cross-platform Security Patch Management; copyright date 2002.
Proctor; no later than Jan. 8, 2001.
Q. What is Qchain.exe?, from www.ntfaq.com; Jul. 23, 2001.
Review: SPQuery v4.1, from www.networkcomputing.co.uk/back-iss/prod_update/reviews/spquer4.1.htm.
Reviews: Product Reviews & Mentions, from www.stbernard.com/products/updateexpert/products_updateexpert-reviews.asp, pp. 1-3.
Robinson, C., "PatchLink.com Brings Remote Management Online"; Dec. 4, 2000.
SafePatch Description, pp. 1-3; Oct. 16, 2000.
SafePatch version 0.9 user manual.
Safepatch; Oct. 2000.
SC Online Magazine: UpdateEXPERT found at www.scmagazine.com/scmagazine/sc-online/2002/review/14/product.html.
Shipley, G., "Tools From the Underground"; May 29, 2000.
sourceforge.net pp. 1-2; copyright date 1999, 2000, 2001.
SPQuery v4.1, from www.networkcomputing.co.uk web site via link in #A1; Nov. 2000.
St. Bernard, St. bernard Software Simplifies Nt Service Pack Management With SPQuery, Apr. 20, 2000, Business Wire.
Sturdevant, C., "ZENWorks Cuts Legwork in NetWare Shops"; Mar. 13, 2000.
Swoyer, Stephen, "Hotfix Management Tools Maturing", Nov. 19, 2001, ENT News.
Systems Management Server | Executive Overview, date unknown.
Systems Management Server Product Overview, Features, from www.Microsoft.com; Jan. 29, 2002, Feb. 8, 1999.
Technical Comparison of Systems Management Server 2.0 and Novell's ZENworks 2.0; copyright date 2000.
The Open Software Description Format (OSD); Aug. 11, 1997.
The Power of Optional Agent Architecture: Advantages of Managing Patches Remotely with UpdateEXPERT™, (Apr. 1, 2003).
Timbale For Server Management, pp. 1-2; Dec. 21, 2000.
Topaz news release; Oct. 4, 1999.
Topaz white paper; copyright date 2000.
UpdateEXPERT: Product Reviews & Testimonials from www.stbernard.com web site; various dates are listed.
UpdateEXPERT™ v. 6.0 Deployment Guide.
Webopedia.com definitions; copyright date 2001.
Welcome to Windows Update page; copyright date 2001.
What's New: New Features in Version 6.0, pp. 1-2.
Why Nevada Federal Moved to Patch Management App., The Credit Union Journal, www.cujournal.com, pp. 1-2 (Jan. 20, 2003).
winfingerprint pp. 1-3; no later than Sep. 10, 2001.
www.freshtech.com web pages, pp. 1-8; copyright date 1996-2000.
www.hostedhelpdesk.com pp. 1-4; no later than. Jan. 8, 2001.
www.jameshuggins.com.
www.microsoft.com/smsmgmt pages, pp. 1-27; Jun. 23, 1999.
www.mspassociation.org web pages, pp. 1-6; no later than Nov. 28, 2001.
www.osintot.demon.co.uk/ntsetup.com—Sep. 17, 2000.
www.rhesolution.com pp. 1-4; no later than Jan. 8, 2001.
www.shavlik.com pp. 1-12; copyright date 2001.
www.sitepatrol.com pp. 1-2; no later than Nov. 28, 2001.
www.thestandard.com article; Dec. 21, 2000.
www.triactive.com page; no later than Nov. 28, 2001.
Office Action in corresponding U.S. Appl. No. 10/394,447 (Oct. 24, 2008).
Chang Liu, et al. "Automated Security Checking and Patching Using Test Talk", IEEE Comput.Soc.,US, Sep. 11, 2000, pp. 261-264.
Notice of Intent to Issue *Ex Parte* Reexamination Certificate in related U.S. Patent No. 6,990,660, mailed Feb. 12, 2009.
*Ex Parte* Reexamination Certificate of related U.S. Patent No. 6,990,660, issued May 12, 2009.

Request for *Inter Partes* Reexamination of related U.S. Patent No. 6,990,660, filed May 19, 2009.
Order granting *Inter Partes* Reexamination of related U.S. Patent No. 6,990,660, mailed Jul. 24, 2009.

Action Closing Prosecution in *Inter Partes* Reexamination of related U.S. Patent No. 6,990,660, mailed Jul. 24, 2009.

\* cited by examiner

NON-INVASIVE AUTOMATIC OFFSITE PATCH FINGERPRINTING AND UPDATING SYSTEM AND METHOD

CROSS-REFERENCE TO RELATED APPLICATIONS

This application is a Continuation Application of and claims priority to U.S. application Ser. No. 09/957,673, filed Sep. 20, 2001, entitled OFFSITE PATCH FINGERPRINTING AND UPDATING SYSTEM AND METHOD, which claims priority to and incorporates by reference U.S. Provisional Patent Application No. 60/234,680, filed Sep. 22, 2000, both applications of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The copyright owner does not hereby waive any of its rights to have this patent document maintained in secrecy, including without limitation its rights pursuant to 37 C.F.R. §1.14.

FIELD OF INVENTION

The present invention relates to systems and methods which update existing software across a remote network. The invention relates more specifically to checking for the need for updating and then updating the software as required across a client-server system without the need for human oversight, and without requiring that a target network administrative machine keep copies of software patches.

TECHNICAL BACKGROUND OF THE INVENTION

The 'state of the art' in the computer software industry remains such that software is often delivered with various anomalies in its desired behavior. These anomalous behaviors have come to be called "bugs".

The original computer bug is in the operations log of the Harvard University Mark II Aiken Relay Calculator, now preserved in the Smithsonian. The operators removed a moth that had become trapped between relay switches in the computer, and wrote the entry "First actual case of bug being found." Problems with computer hardware and software have since been called "bugs", with the process of removing problems called "debugging".

Each time software is "debugged", a change to that piece of software is created—this change sometimes results in an additional piece of software called a "patch" or "fix". The industry's software vendors often call these patches by the more formal names "Service Packs" or "Support Packs."

This process has become so prevalent in the industry that software vendors use various naming and numbering schemes to keep track of their available "Support Packs". The difficulty of keeping these "Support Packs" straight is increased when vendors fail to agree on a standard scheme of naming and numbering.

Microsoft, for instance, for its Windows NT family of operating system software products has no less than six major "Service Packs" available to be applied to solve problems its customers may experience. More generally, the total number of patches, fixes, solutions, and/or service packs for any given operating system may be enormous.

When an application is installed, it may contain one or more of these operating systems file patches along with the standard computer files. The patches are generally included because the application vendor discovered some anomalous behavior in one or more of the operating system files, and so sent a "fix" in the form of a different version of one of these troublesome files. This would cause relatively little difficulty if only one application vendor performed this service, or if the file modified by the application vendor is used only by that vendor's application. However, this is often not the case.

When another application is installed, that application may include a more recent version of a shared piece of code. One subset of these shared operating system files are called DLL's (dynamically linked libraries), though they also go by other names. These shared operating system files are often executable, and they expect a fixed number of parameters, certain kinds of parameters, and so on. If the nature of the shared file has changed (e.g., the parameter set is different, the name is different, the function is different), the calling application may no longer behave correctly. Many common computer functions such as "print" are referenced in this fashion.

Many software vendors try to provide the "latest" version of the operating system file. However, when a different application is loaded onto a computer, it may overwrite and subtly (or not-so-subtly) change an operating system file that the original application needed to function as planned.

Assume an administrator for an organization is charged with keeping one hundred servers up and running while supporting three thousand users connecting to these servers. The administrator is also responsible for installing user requested or management dictated applications—either shrink wrapped purchases or internally developed applications. The administrator also has responsibility for the timely distribution, locally or remotely, of time sensitive documents.

Now imagine that six service packs must be installed on the network and distributed to all of the clients. Applying the six service packs could easily result in seven visits to each and every one of the hundred servers for a total of seven hundred visits. This number assumes one extra visit per machine because the application of one of the service packs may cause more problems than it fixed, so it had to be undone.

If the three thousand clients were all running the same workstation operating system, that could mean another twenty-one thousand visits to apply the patches. Remember this all has to be accomplished while installing and patching the internally developed applications and the shrink-wrapped products. Distribution of software patches and files and their subsequent application becomes the first indication of what might be called "administrator agony".

While all the installation is occurring, the individual servers must still be monitored. When a server needs attention the administrator is often contacted by another person, who may frantically report that their server is down and must be fixed. If the administrator had some method to monitor these devices, he or she could become more responsive and further reduce the impact of problems. Monitoring needs are a second indication of "administrator agony". There is often high turnover in the administrator's job, and the users of these systems may experience lower productivity.

Traditionally, the administrator had been helped by being given extra staff. Of course this remedy is not without problems—the addition of personnel increases the number of communication channels between them. The people involved in installation and updates need a tracking device or system so they don't perform or attempt to perform the same unit of work. This lack of coordination between team members is a third indication of "administrator agony".

Proposed solutions are currently available in varying forms, implementations, and coverage or completeness. Typically these proposed solutions are available as shrink-wrap products that are installable (e.g., patchable) locally in the administrator's environment. Some emerging products are helpful, but many conventional solutions are invasive in that they require massive modification of the administrator's environment. The shrink-wrap solution requires additional invasive full product installations in the administrator's network, thereby adding to the problem, and lacks a central "command center" to coordinate the support or distribution plan. Emerging solutions may provide a somewhat lesser degree of invasion, but nonetheless require a special connection between the administrator and the solution, and they often do not provide a center for coordinated efforts.

Furthermore, it is not always obvious exactly what patches, if any, a given piece of software has received. Updates don't always clearly announce their presence. So, it is not always clear whether a specific computer has previously received a specific patch. Accordingly, there is a need for improved tools and techniques for updating computers across a network. Such tools and techniques are described and claimed herein.

BRIEF SUMMARY OF THE INVENTION

The present invention relates to methods, articles, signals, and systems for determining if software needs updating, and if so, then updating the software across a network with reduced demands on a human administrator. If the update fails, the computer(s) upon which the update software was installed may be restored to a non-updated state.

In various embodiments, the invention facilitates software deployment, software installation, software updating, and file distribution based on software and patch finger printing across multiple operating systems and devices, across a network. Any computer with a network connection and with an update agent running on it may connect to an update server, and then process whatever tasks the administrator has designated for that agent.

FIG. 2 shows an overview of one such system. A network 200, shown with only two target computers and an update computer for simplicity of illustration, is protected from the internet by a firewall 214. The software that is needed to update network target computers 202, 208 resides on package computers 230, 234 that are located inside or outside the firewall and barred by the firewall 214 from direct communications with the target computers 202, 208. However, an update server 220 does have access 216 to the network 200, potentially through internal firewalls—as well as access through the firewall 214. The system is designed to work both as an onsite purchased solution as well as a fully offsite hosted solution, and can operate through firewalls and proxy circuits at any level within the Intranet/Extranet infrastructure.

Patch fingerprints 902 give a recipe to allow a repository component to determine if a given software package (associated with the patch fingerprint), patch, driver, etc. should be loaded onto a computer in the system. These fingerprints are stored in a patch component database location 900 that may be inside or outside the firewall 214. It may be at a separate location or it may be installed on the update server 528. The repository component also includes an inventory library database 918 that contains basic hardware and software information about each of the network target computers 202, 208.

Using the information in the patch fingerprint, the inventory library, and specific information gleaned from each network target computer, the system is able to intelligently recommend which patches and drivers are required for a given computer.

As shown in FIG. 5, the preferred embodiment of the invention employs an additional agent known as the discovery agent 548 installed on the target computer 500, which routinely discovers the hardware and software on that machine. This inventory information is then reported back to an inventory library 918 located somewhere else in the repository component. In addition to the computer inventory, the discovery agents also return scan results for patch fingerprints, which indicate whether it is appropriate to install a specific patch associated with each patch fingerprint.

The Inventory Database thus collects a complete inventory of the software, hardware and current patch fingerprints that are installed on any particular target computer within the network. With this information, the update server 528 can present the user with detailed reports of the current patch status for all computers within the network. This illustrates the number of computers needing the patch as well as the computers already installed with the patch.

In addition, Finger Print definitions 906 are also normally associated with an update package suitable for deployment by the system. Once the need for a particular patch has been established by scanning its signature(s) on all computers within the network it can then be quickly deployed by the administrator by merely selecting the date and time.

The patches that need to be loaded onto specific target computers are listed on the update server 220 in update lists 222 associated with update agents 204, 210; in the illustration, list 224 is associated with Target1 202, and list 226 is associated with Target2 208. The update lists specify at least one location (through means such as a universal resource locator, or URL) where the patch can be found, and optionally include a date which is the earliest date that the software can be installed.

In operation, the update agent 204 of Target1 202 checks its update list 224 at the onsite or offsite update server 220 to see if a new package should be installed. If one is there, the update agent 204 checks to see if the package is already in memory on the update server 220. If so, the update agent 204 attempts to install the software patch directly from the update server 220. If not, the update agent 204 attempts to install the software patch directly from the package computer location 232. In some instances, this is successful, in which case the update list 224 is updated.

In other cases, a download 218 will be obstructed by the firewall 214. If this happens, the update agent 210 informs the update server 220 and then the update server 220 itself will attempt to retrieve the package and place it in memory 228. From that memory on the update server, the software is installed directly to the target machine.

A monitor checks to see that the software installs properly on the target 202, 208, and then continues checking (or can be notified) to ensure that the updated software runs correctly and that the target computer itself doesn't experience any problems in what appear to be unrelated areas. Should the package fail to install properly, or create problems for the software program that was patched, or create other problems on the target computer, the package can be automatically removed and the computer restored to its preinstalled state or another acceptable state in which the update has been removed or disabled, and the target computer is in a workable state. If the package has been installed on more than one computer, they all can be removed. If the error occurs in the middle of a rollout to many computers, the rollout can be halted and the software removed or disabled. The monitor may be located on the update server 220, on a repository site 600, at least partially in the update agent 204, 210, and/or in a combination of such locations.

When there is a problem with an installation, or when an installation is successful, an administrator can be notified by email, by pager, by beeper, or by some other notification means.

The update agent 204, 210 can also be used to survey its own target computer, and this information can be stored in a database offsite or at another location. This information can then be used to determine what updates a given target computer needs in order to have the most appropriate configuration. When a new software patch becomes available, the stored information can be used to determine if a particular target computer needs the patch.

Other aspects and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention provides systems, methods, articles, and signals which help update existing software across a remote network. The invention relates more specifically to updating software across a client-server system with little or no need for human oversight, and without requiring copies of the software patches on an administrative machine on the network whose clients are being updated. The update is automatic, and it can detect errors within a specific update and automatically rollback a faulty update to leave the network in a usable state.

Separate figures discussed herein illustrate various embodiments of the present invention, but the discussion of a given figure is not necessarily limited to a particular type of embodiment. For example, those of skill will appreciate that the inventive methods may also be used in configured storage media and/or computer system implementations according to the invention. To prevent unnecessary repetition, the discussion of methods thus applies to articles and systems, and vice versa, unless indicated otherwise. It will also be appreciated that method steps or system components may be renamed, regrouped, repeated, or omitted, and that method steps may be ordered differently and/or performed in overlapping execution, unless the claims as properly understood call for particular steps or components and/or require a particular order of execution.

For the reader's convenience, some pertinent information on related technologies such as networks and firewalls is provided below. The invention goes beyond previously known technologies, but it may partially comprise or rely on earlier advances in computing and networking and/or be used together with such earlier advances.

Systems Generally

Figure 1:
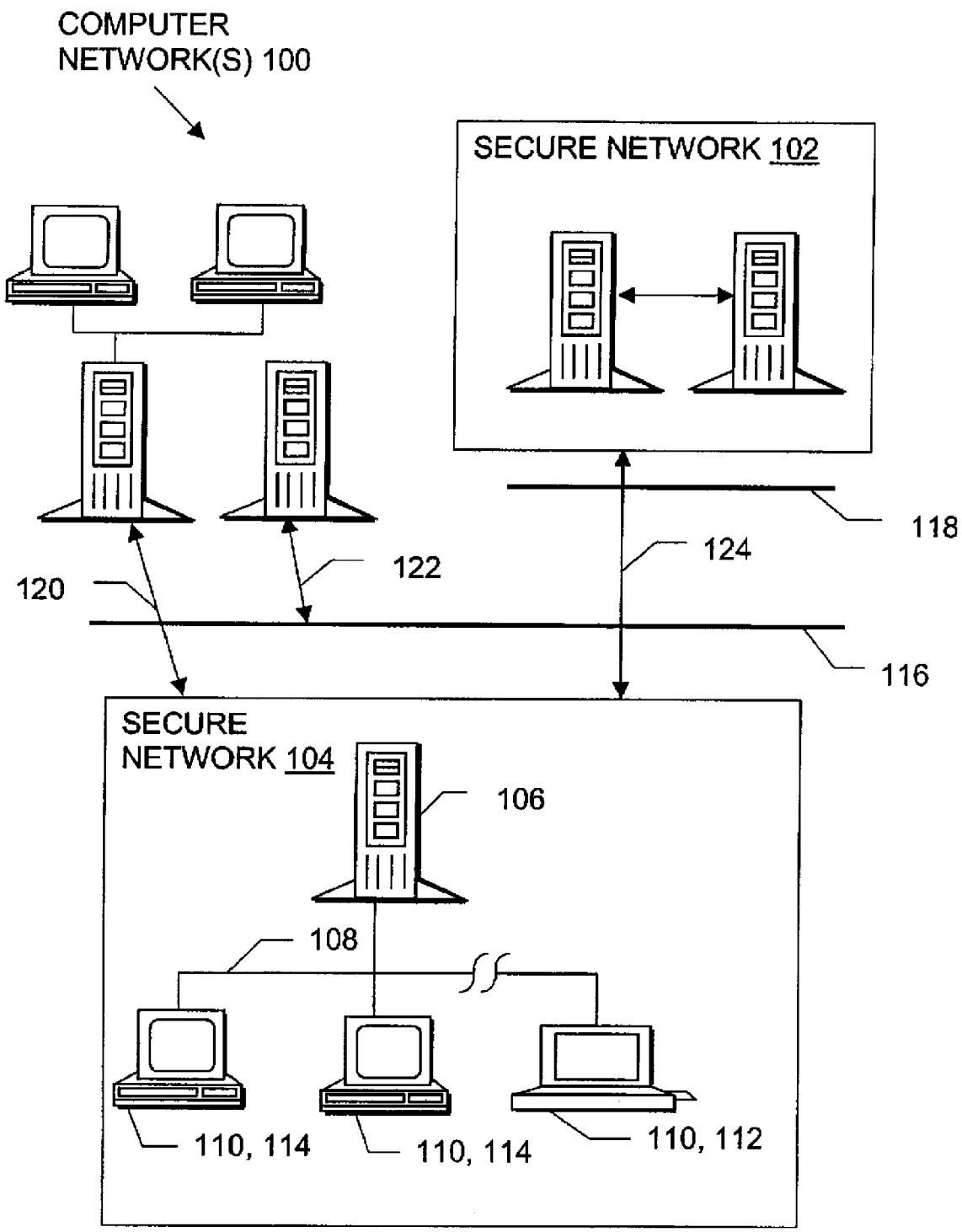
FIG. 1 is a diagram illustrating one of the many distributed computing systems suitable for use according to the present invention.
Figure 2:
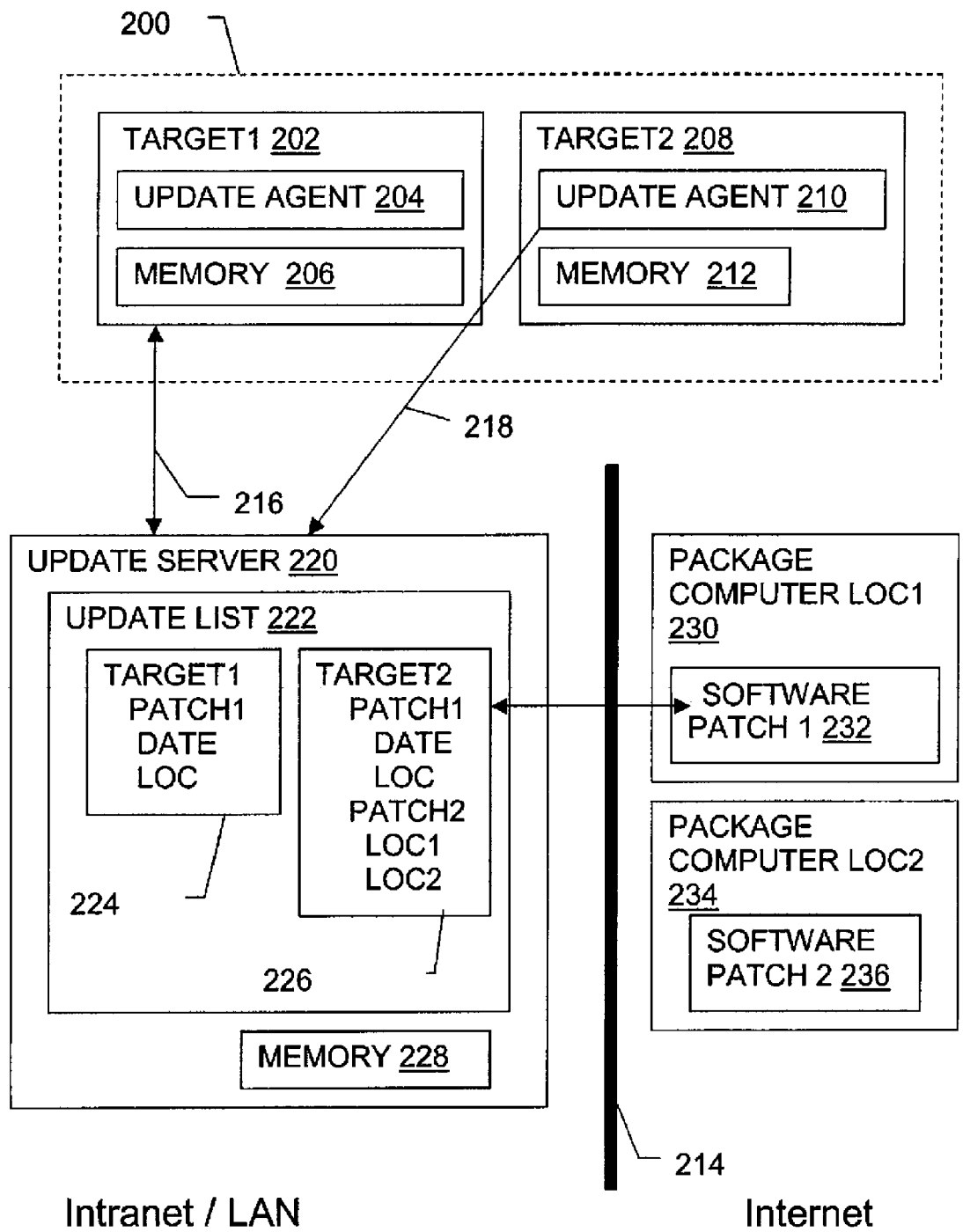
FIG. 2 is a diagram illustrating systems according to the present invention.

As shown in FIG. 1, computer networks 100 such as secure computer networks 102, 104, may be configured according to the invention. Suitable computer networks 100, 102, 104 include, by way of example, local networks, wide area networks, and/or portions of the internet. "Internet" as used herein includes variations such as a private internet, a secure internet, a value-added network, a virtual private network, or an intranet. Secure networks may be secured with a security perimeter which is defined by firewall software 116, 118 routing limitations, encryption, virtual private networking, and/or other means. The network 100, 102, 104 may also include or consist of a secure intranet, which is a secure network such as a local area network that employs TCP/IP and/or HTTP protocols internally. The computers 110 connected by the network for operation according to the invention may be workstations 114, laptop computers 112, disconnectable mobile computers, servers, computing clusters, mainframes, or a combination thereof. The computer hardware may be general-purpose, special purpose, stand-alone, and/or embedded. The network 100 may include other networks, such as one or more LANs, wide-area networks, wireless networks (including infrared networks), internet servers and clients, intranet servers and clients, or a combination thereof, which may be protected by their own firewalls.

A given network 100 may include Novell Netware network operating system software (NETWARE is a registered trademark of Novell, Inc.), NetWare Connect Services, VINES, Windows NT, Windows 95, Windows 98, Windows 2000, Windows ME, LAN Manager, or LANtastic network operating system software, LNIX, TCP/IP and NFS-based systems, Distributed Computing Environment software, and/or SAA software, for instance (VINES is a trademark of Banyan Systems; NT, WINDOWS 95, WINDOWS 98, WINDOWS 2000, WINDOWS ME, WINDOWS XP and LAN MANAGER are trademarks of Microsoft Corporation; LANTASTIC is a trademark of Artisoft; SAA is a mark of IBM). The network may include a local area network which is connectable to other networks through a gateway or similar mechanism.

One system according to the invention includes one or more servers 106 that are connected by network signal lines 108 to one or more network clients 110. The servers and network clients may be configured by those of skill in the art in a wide variety of ways to operate according to the present invention. The servers may be configured as internet servers, as intranet servers, as directory service providers or name servers, as software component servers, as file servers, or as a combination of these and other functions. The servers may be uniprocessor or multiprocessor machines. The servers 106 and clients 110 each include an addressable storage medium such as random access memory and/or a non-volatile storage medium such as a magnetic or optical disk. The signal lines 108 may include twisted pair, coaxial, or optical fiber cables, telephone lines, satellites, microwave relays, modulated AC power lines, and other data transmission "wires" known to those of skill in the art, including wireless connections. Signals according to the invention may be embodied in such "wires" and/or in the addressable storage media.

In addition to the network client computers, a printer, an array of disks and other peripherals may be attached to a particular system. A given computer may function both as a client 110 and a server 106; this may occur, for instance, on computers running Microsoft Windows NT software. Although particular individual and network computer systems and components are mentioned, those of skill in the art will appreciate that the present invention also works with a variety of other networks and computers.

Suitable software and/or hardware implementations of the invention are readily provided by those of skill in the art using the teachings presented here and programming languages and tools such as Java, Pascal, C++, C, Perl, shell scripts, assembly, firmware, microcode, logic arrays, PALs, ASICs, PROMS, and/or other languages, circuits, or tools.

Configured Media Generally

The servers 106 and the network clients 110 and individual computers 110, 114 are capable of using floppy drives, tape drives, optical drives or other means to read a storage medium. A suitable storage medium includes a magnetic, optical, or other computer-readable storage device having a specific physical substrate configuration. Suitable storage devices include floppy disks, hard disks, tape, CD-ROMs, PROMs, RAM and other computer system storage devices. The substrate configuration represents data and instructions which cause the computer system to operate in a specific and predefined manner as described herein. Thus, the medium tangibly embodies a program, functions, and/or instructions that are executable by the servers and/or network client computers and/or individual computers to perform updating, monitoring, administrative and/or other steps of the present invention substantially as described herein.

Firewalls

Network administrators generally do not allow just any information into their system. Rather, they use a firewall 116, 118 to protect the network from security threats. A firewall is hardware and/or software device that screens incoming messages (often based on content, origin, or nature of request) and only allows to pass those that are deemed safe. Three main types of firewalls are screening routers (also called packet filters), proxy server circuit-level gateways, and proxy server application-level gateways. Screening routers can base decisions on external information about a network packet such as its domain name and IP address, so messages that come from acceptable domain names and IP addresses can be allowed through 120, 124 while refusing messages from other locations 122. Proxy server circuit-level gateways disguise information about an internal system when passing the information to an external system. The IP addresses of the internal computers are typically replaced with the IP address of the proxy. At this level, authentication can be required. Proxy server application-level gateways provide all of the features of screening routers and circuit level gateways while also allowing the contents of the packets themselves to be evaluated. Messages can be rejected for content as well as for security violations.

Software Installation

System administrators often need to change the software on a specific machine. A new piece of software must be installed for the first time, as when a new application is added to a machine. An already-installed piece of software can be updated, as when a new version of an existing piece of software will be installed on a specific machine; this is also referred to as "replacing" the software. A data file of an existing piece of software can be updated without otherwise changing the software configuration, as when tax tables are updated on an accounting program, or when anti-virus software files are updated. If a problem is discovered in an existing piece of software, then a fix or patch can be installed. Any or all of these changes to the state of a specific machine or machines are referred to in this patent as "installation". Similarly, the words "package," "patch," and "update" should be given the broadest possible meaning. For example, package could refer to an entire program including all the necessary files, to one or more data files, to a software patch to an existing file, to a change to a configuration file, to a *.dll file, a driver file for a specific piece of hardware attached to a computer and/or a computer network, and so on. "Update" refers to at least attempting to install a package on a computer.

Methods Generally

Figure 3:
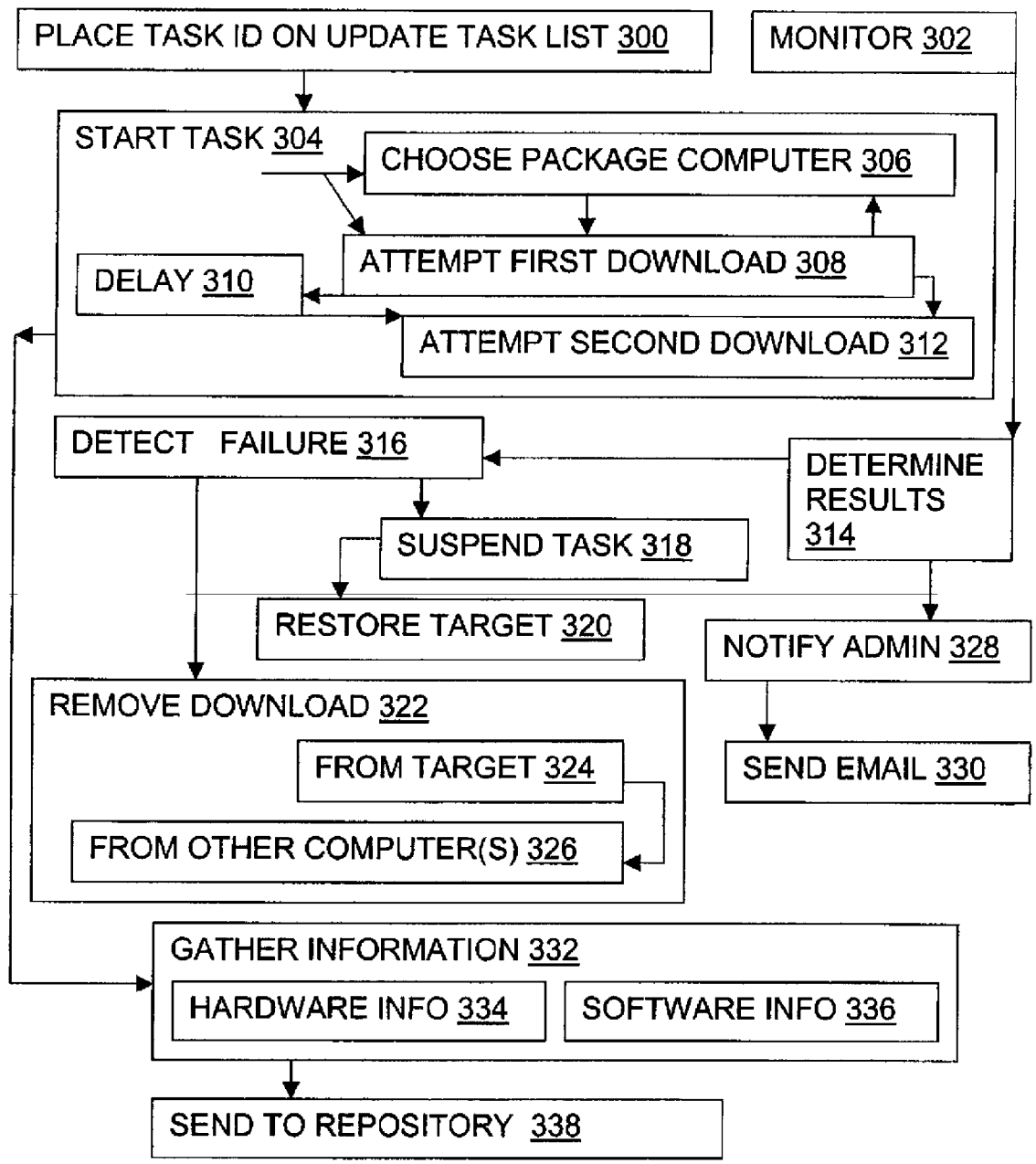
FIG. 3 is a diagram illustrating methods according to the present invention.
Figure 4:
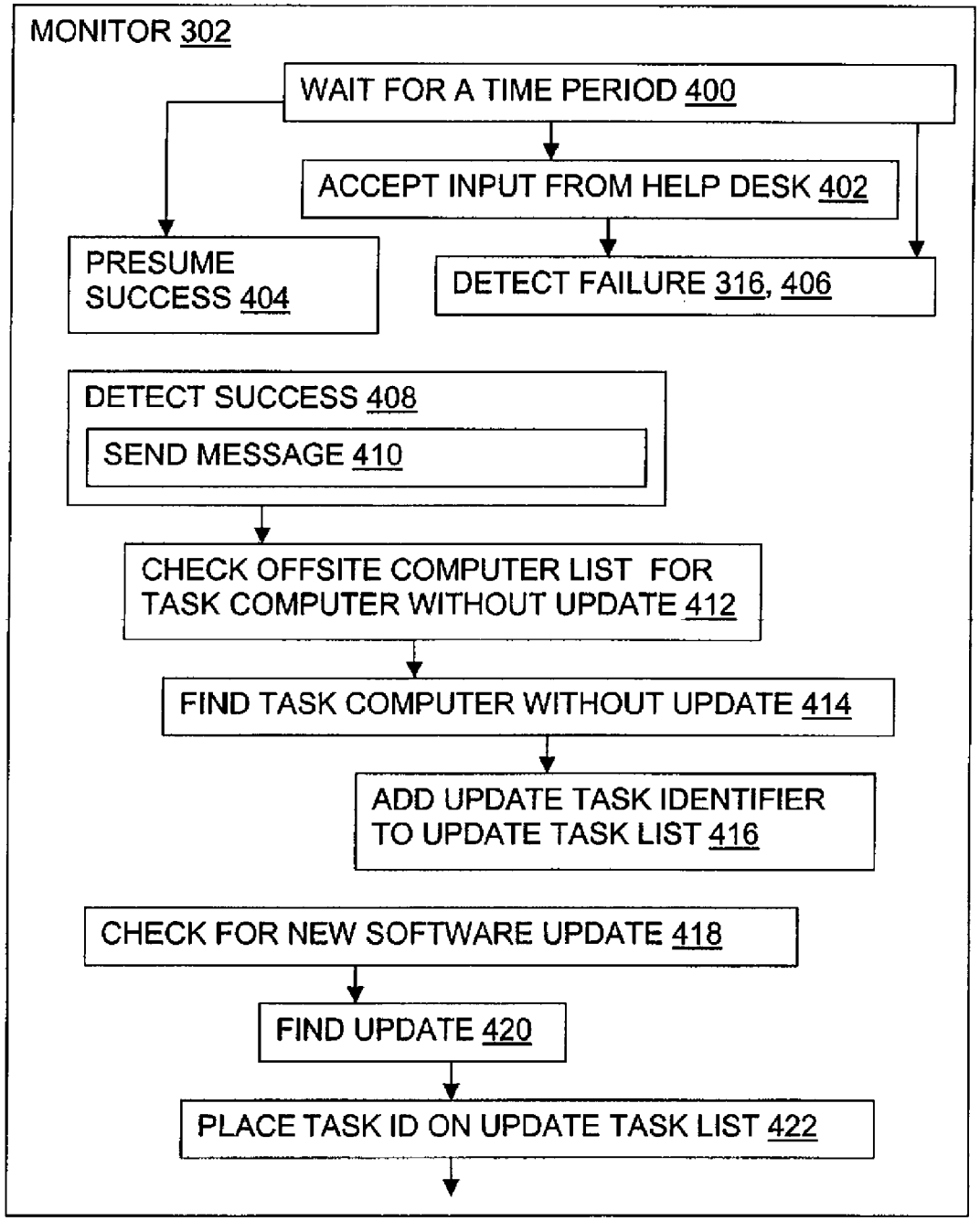
FIG. 4 is a diagram further illustrating methods according to the present invention.
Figure 5:
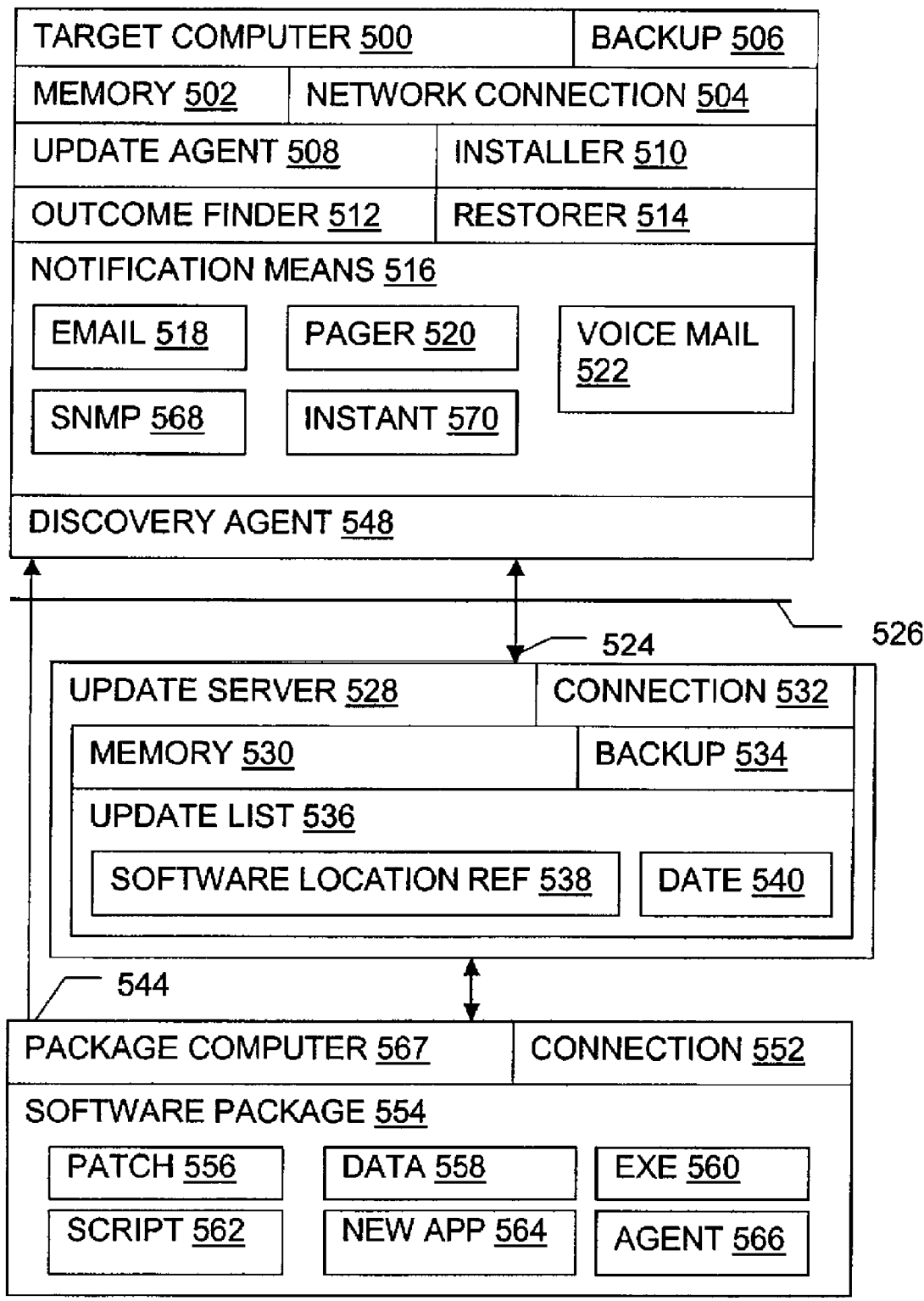
FIG. 5 is a diagram further illustrating systems according to the present invention.

With reference to FIGS. 3, 4, and 5, one embodiment of a method operating according to the present invention includes a target computer 500 in a pre-update state. The target computer 500 is the computer that the invention will at least attempt to update; not every embodiment of the invention requires that the update be successful. An update server 528 is connected across a network 524 to the target computer. In some implementations the target computer has a non-graphical user interface network connection, such as a connection through a winsock layer. Typically, the target computer is protected by a firewall 526, as explained above, but the update server can drill through the firewall to access the target computer.

An update agent 508 is located at each computer that is to be updated. The update agent is a software component (usually not very large) that may be installed initially, either in the traditional manner or by using the invention, on the network target machines such as workstation(s) and/or server(s). The update agent is capable of operating in the place of the human administrator, at the direction of the human administrator, to perform work in a manner similar to what could be performed if the human administrator was actually present at the machine. The update agent knows how to perform two basic tasks: 1) how to contact the update server 528 to retrieve a list of tasks and 2) how to start the tasks in the task list received.

The update agent is capable of updating, configuring, or replacing itself without the need for manual intervention after the initial install. Typically a small boot-strap agent will be installed initially, but will grow in abilities as the administrator dictates or as required to fulfill administrator requests. The update agents of different sorts of target computers 500, such as onsite administrator computers, server computers, and client machines, can all start out as the same version of a single agent. Machines in a given network can all have a the same agent installed, or machines can have unique agents installed. When there is more than one client, each can have a different update agent initially, or a mix of agents can be installed on different client machines, as is chosen by the administrator, or as is set up as a default. Similarly, multiple servers and administrators can also have a mix of different agents initially installed. As the agents for the individual target computers change, they can all change in concert or they can diverge. In some embodiments, the agents may all start out different and then converge in functionality.

The offsite location of the update server 528 is a location distinct from the target computer. The location may be offsite at a completely different vendor, or offsite at a different physical location from the target computer 500 but at a location managed by the same entity, at the same physical location. It may be at a different-appearing location from the target computer 500, such as at a subcontractor location, or at some other distinct-appearing location. The important point is that as far as an individual target computer operating system is concerned, the work appears to be off-site. One embodiment locates the update server on the target computer 500 but in a fashion (such as in a different partition) that appears offsite.

The actual update material that is to be installed on the target computer is often stored at a separate location (known as the package computer) apart from the update server and the target computer. The software update itself can be any of a wide variety of software that can be updated across a network, such as an incremental software patch, a new software program never before installed on the target computer, an update to an old program, software scripts, data files, or even an update of the update agent.

If a known condition is met, during a placing step 300, a task id is placed on an update task list 222. The known condition could be that the patch is not currently on the computer, that the administrator has given assent, the owner of the target computer 500 has permission from the owner of the package, the fact that no one has specifically denied placing privileges, or some other known or inventive condition. The update task list located on the update server is associated with a specific target computer 500, and specifies at least one download address where the software update can be found. The download address can be in any format that is understandable to the computers. The invention does not depend upon any specific addressing convention. Two common addressing formats in use currently are the "Universal Resource Locator" and "fully qualified domain name" formats. Other formats are PURLs (Persistent Uniform Resource Locators) and URN's (Uniform Resource Names), and other naming schemes may be known in the future. Other information that may be included in the task identifier, such as a date the download will first be attempted. Multiple download addresses, each of which specifies a location where the software update can be found, may all be associated with a specific software update.

During a starting task step 304, the software update is at least attempted to be uploaded from the package computer 567 to the update server 528. During an optional choose package computer step 306, if more than one download location is placed on task id list 226, the location that the software update will be downloaded from is chosen. The choice can be made by any known or inventive method, such as using the first location on the list, using the location that a test message returns from most rapidly, using the first available machine, and so on.

Once a location for the update is known, the software download is attempted from the location of the package computer 548 to the memory 530 of the update server 528. If the download is unsuccessful, then in one inventive method another location from the list of possible locations in the task update list is chosen, and the download of the software update is retried. In some implementations, if the download can't be completed for some reason, the update server 528 waits for a time and tries to download from the package computer 567 again. If the download is successful, then the update server 528 attempts to download 312 the software update to the target computer 500.

Once the download is in cache or other memory in the update computer a second download 312 is attempted to download the software package from the update server to the target computer. In some embodiments of the method, the second download 312 is delayed 310 by some predetermined criterion. This delay may be from the start of the first download, with the delay period based on an estimate of the time needed to download the software update from the package computer to the update server. The second download may also be delayed to a specific time of day when the target computer 500 has less of a chance of being used, such as after a business closes for the day. Other known or inventive delay criteria may also be used.

A monitor 302 checks the installation, performing the role typically played by an administrator, to determine the results of the installation 314. Once the results are known, an administrator can be notified 328. Notification can be by sending an email 330, by paging someone, by sending a pre-recorded phone message, or by any other known or inventive method and means.

If the monitoring step detects a failure 316, then the task that failed is suspended 318. The first download 308 to the update server 528 could fail, as could the second download from the update server 528 to the target computer 500. If there are multiple target computers having the software update installed, the Nth installation could fail, and so on. Determining results preferably goes beyond simply ensuring that the software update appears to have installed properly, and in some embodiments of the invention extends for a time beyond the installation. For example, one embodiment of the monitor will test a patch application by having it installed it on only one target computer, assuring that it downloads properly, and then watching it for some period of time until the administrator who sets the time delay gains enough confidence in the patch to allow it to be applied to other target computers. Should the application of this patch cause abnormal activity, as noticed by undesirable behaviors either in the program whose software was modified or elsewhere in the computer, the rollout can be automatically discontinued until the problem is resolved.

Furthermore, in some instances when failure is detected the software update is disabled or removed 324 from the target computer, and that machine is returned substantially to its pre-update state or another acceptable (working) non-update state. This may mean that the installed software is taken off the target machine 322; or that not only is the software removed, but all the ancillary files (.dll's, .exe's, etc.) are restored to their pre-update state. In other instances it may mean that the target computer or some portion thereof was backed up before the software update was installed, and the backup itself is restored onto the machine.

If there are multiple target computers 500, failure may be detected by the monitor after the software has been installed on one or more machines. In this case, the software update can be removed 322 from not only the target computer 500 where the failure was spotted, but it can also be removed 326 from all of the other target computers 500 where the software was previously installed 326. The removal request can come from an administrator or removal can be performed automatically after failure is detected 316.

The monitor 302 may perform more tasks than simply waiting to hear if a software package has installed successfully. For example, in some instances the monitor waits for a time period 400 after the installation and if it has not heard otherwise, assumes that the installation was successful.

Administrators and administrator helpers can benefit greatly from a central repository where they can enter and retrieve information regarding requests for help. One such method is help desk "ticketing". Ticketing records the requester, the type of request, when help was requested, when the response to the request was completed, and other useful information. A PatchLink HelpDesk service provides facilities for administrators to manage their network requests and network resources, both people and computer resources, via one central repository. PatchLink HelpDesk software provides these facilities across the internet without an invasive application install on the administrator's network that introduces yet another resource that has to be managed, backed up, and updated—this is taken care of transparently at an offsite Management Center.

A website, reachable by a standard web browser or some other known or inventive network connection, provides the facilities to use the help desk services. A preferred implementation is currently at the PatchLink web site, reachable at www.patchlink.com. Simple web forms support the data collection required to begin the enrollment process. Once the enrollment process is complete, the administrator can license one or more services on a recurring subscription basis.

The enrollment process is begun when the administrator initiates the process by signing up and indicating a desired level of participation. A preferred embodiment of the invention has three different user levels: guest, regular, and executive. A guest is allowed to view the web site and can read the user forums but cannot post to the forums. A regular member can perform guest functions and can also chat in chat rooms, and post to forums. An executive member has a subscription to the site. He or she can perform regular member functions, and can also use the more advanced features of the site, such as offsite automatic package updates (e.g., PatchLink Update services), offsite monitoring (e.g., PatchLink Monitor services), and the offsite help desk functions (e.g., PatchLink HelpDesk services).

One embodiment of the method entails an email being sent to a customer care agent assigned to the customer's telephone area code. The customer care agent telephones the pending user to complete the enrollment process. The customer care agent collects the necessary identity information and payment information, and then upgrades the pending user's account to permit use of the account, making the pending user an administrator/user. The areas the administrator/user can participate in or use is controlled by entries in the licensed product's table of the update host's database. These entries are created by the customer care agent during the enrollment process.

Recall that all these services are available to the administrator via a browser or other network connection across the internet. When a monitor enters a ticket into the help desk and initiates a rollout in some instantiations of the inventive method, the monitor then decides whether a failure has occurred 316, 406. To decide the monitor may look at what software updates have recently been installed, how long ago the installations occurred, the current hardware and software configuration, and so on. Which incidents are considered failure can be, without limitation, set by an administrator; defaults can be used, and judgment of the help desk personnel can be taken into account.

In a detect success step 408 the target computer 500 sends a message 410 to the update server after the download from the update server to the target computer has completed successfully. The monitor can presume success 404 if a specified time period has passed without noticing or being notified of a failure.

Failure can be detected in other ways 316, 406. For instance the target computer can notify the monitor that a failure has occurred; a user can notify the monitor through the help desk or through a direct link that a failure has occurred; when a target computer does not contact the monitor within a specified time from the beginning of the second download 312 onto the target machine, a human administrator can declare that a failure has occurred; and so on. Notice that even after the monitor has declared the outcome of a download to be a success, later events, such as an indication of failure from the help desk, can cause the monitor to declare the download to be a failure.

In one embodiment of the invention, the update server 528 waits for a confirmation of a successful installation (by the monitor, or by another known or inventive contact method) before the next target computer 500 has the software update placed on its update list 222. The update server checks for a target computer 500 that is eligible for the software update but has not yet received it 412. If one is found 414 the appropriate task identifier, specifying the target machine, the software update, and the location, are added 416 to the update server's 528 task update list. This way, rather than a mass update where all eligible computers have the software installed on them en masse, the rollout proceeds one computer at a time until, after a default or user-defined number of successful installations, the rollout is deemed a success; at that juncture the software update is made available to more than one target computer at a time.

It is not always clear by looking at a specific target computer 500 what software packages and patches have been installed. The invention includes a method to analyze a target computer 500 to ensure that a given patch has not already been installed on the computer 500 before the invention attempts to install that patch. The following discussion includes references to FIGS. 8 and 9 and continuing reference to FIG. 5.

A patch fingerprint which defines a specific software update is described in greater detail below. The patch fingerprint is located 800 by monitoring a patch component database location 900 for a new patch fingerprint 902. The word "new" here indicates that the patch has not yet been downloaded into the repository component 600, or for some reason needs to be downloaded into the repository component again, even though it has been downloaded previously. There may be one or many patch component locations; those locations may be on a separate computer connected to the system through a network link, on the update server 528, on the target computer 599, on the package computer 567, on a non-networked location such as a CD, a tape, a floppy disk, etc., or some other known or inventive location.

Once the patch fingerprint 906 is located 800, it is placed 802 into the repository component 600. The usual method of placement is to download 804 the patch fingerprint 906 into the repository component, but in some embodiments the fingerprint 906 will be on the same file system, so the patch fingerprint will be copied without using the network, such as copying between partitions.

The illustrated patch fingerprint comprises one or more general inventory install dependencies 912 that can be used to take a high-level look to see if a specific patch can be installed on a machine. It also includes a signature block 910 that can be used to request specific information from, a target computer 500, and an existence test 908 which can use the signature block information to determine if a specific patch has been loaded on a machine.

In some versions of the invention, the inventory install dependencies 912 describe at least some of the necessary software and hardware that must be installed on the target computer 500. These dependencies 912 are compared 808 with information about the target computer 806 previously stored in the inventory library 918. If the install information and the inventory information don't match, then the patch is not installed. In some versions of the invention a message is sent to at least one administrator containing a list of components required (such as necessary hardware and software) for the install.

If the necessary inventory information is on the target computer 500, or if the inventory info is not used, then the signature block is sent 810 from the repository computer 600 to target computer 500. The information requested in the signature block 814, which may consist of more specific install information, is gathered 812 by the discovery agent 548 and then sent back to the repository component 818. In some versions of the invention, the discovery agent also gathers other information 816 about the target computer such as usage statistics, hardware and software installed, configurations, etc. This information can then be used to populate the inventory library 918.

Once the signature information 910 has been sent to the repository component 600, an evaluator 914 evaluates at least a portion of the specific install information requested by the signature block using the existence test 908, and in some instances the inventory install information 912, to determine if the patch is absent 822 on the target computer 500.

As an optional step, once it has been determined if the patch is absent a message is sent 824 to at least one address associated with an administrator. This message may be sent using a variety of methods, including email, pager, fax, voicemail, instant messaging, SNMP notification, and so on.

Patch Fingerprint

Figure 8:
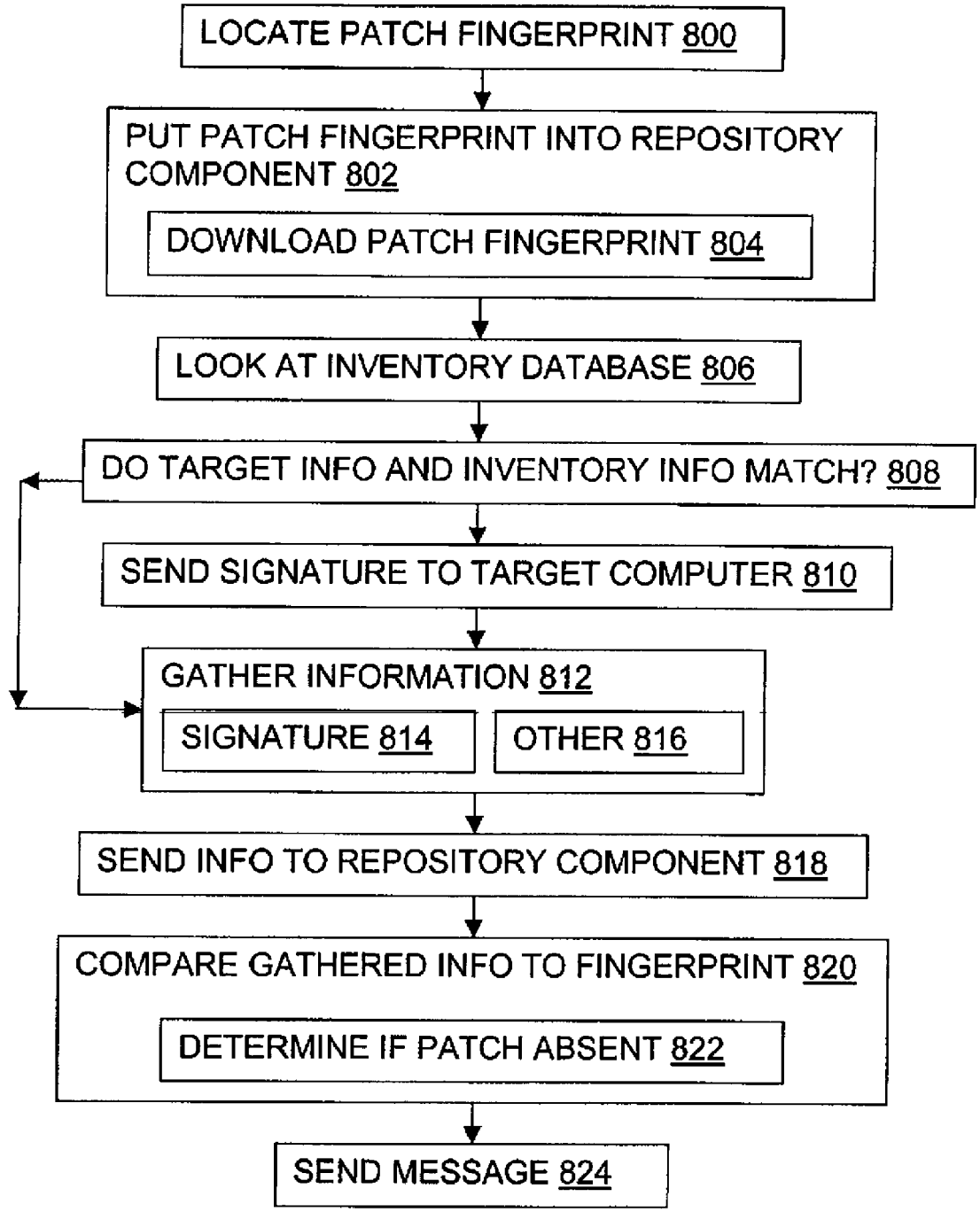
FIG. 8 is a diagram further illustrating methods according to the present invention.
Figure 9:
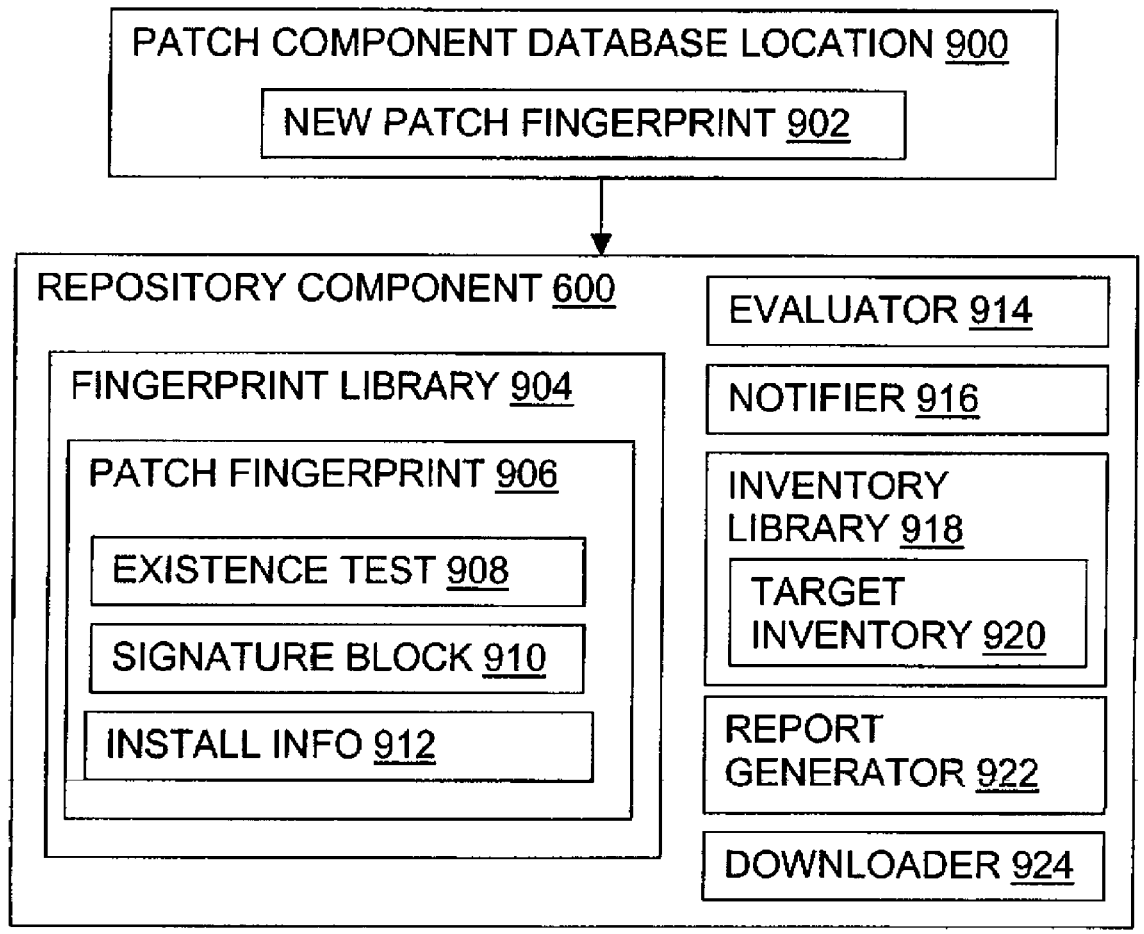
FIG. 9 is a diagram further illustrating systems according to the present invention.

With continuing reference to FIGS. 5, 8 and 9, one embodiment of the system verifies that a software package can reasonably be installed on a given target computer 500 before attempting installation. To do so, a patch fingerprint 906 is used. It defines how to determine if a given software package/incremental patch has been previously installed. It may also define a minimum hardware/software configuration necessary for the patch installation. These patch fingerprints 906 are stored in a fingerprint library 904. The fingerprint library 904 is located on a repository component 600. This repository component 600 may be located on the update server 528, or may be in a separate location accessible to the update server 528 and the target computer 500. Some versions of the invention also include an inventory library 918 which contain target inventories. Each target inventory 920 contains the hardware and software information about a defined set of target computers 500. This defined set may include as few as one computer or as many as all of the computers in a given network, or some number in between.

The fingerprint library 904 can be automatically replenished. In some embodiments, at least one, but possibly several, patch component database locations 900 are monitored 800 for new patches 902. In some embodiments of the invention a signal from the locations 900 indicates to the repository component 600 that new patches 902 are available 800. In the preferred implementation the fingerprint library 904 is updated with new patch fingerprints at specific time intervals. After the repository component 600 is aware of the new patch fingerprint, the patch fingerprint is placed into the repository component 802, usually by using a downloader 924 to download the new patch fingerprint. Patch fingerprints may be entered into the repository components in other ways, however. For example, one or more patch fingerprints may be manually installed into the fingerprint library by an administrator.

Inventory Library

The repository component 600 also contains an inventory library 918. A discovery agent 548, which in some embodiments initially resides on the update server 528, is installed from the update server 528 to the target computer 500 using known or inventive methods. This discovery agent 548, described in greater detail below, inventories at least some of target computer 500's software information 606, hardware information 608 including specific software updates and patches installed, usage information 604, registry information 612, web information 610, configuration information 614, services 618, file information, patch signatures which have been utilized, etc.

This information, or a subset or superset thereof, is then sent, in some embodiments in compressed form, to the target computer inventory 920 in the inventory library 918. Result information can be quite voluminous, and hence may be compressed for efficient upload and to minimize bandwidth usage on the customers network. A preferred implementation sends the data using an XML data transfer, though any other known or inventive data transfer method can be used.

Report Generator

With this information, a report generator 922 can present a user with detailed reports of the current patch status for all computers within the network, illustrating the number of computers needing the patch, the computers already installed with the patch, computers that can't receive the patch until hardware or software is upgraded and so on. In addition, the report generator 922 can provide a partial or complete inventory of the computers attached to the network. In some embodiments the report generator 922 provides graphical presentations of the inventory for analysis by the administrator, both to track location of hardware as well as to ensure software license compliance. However the repository component 600 also uses the inventory library 918 information as well as detected fingerprint information to distribute relevant signatures 910 from the patch fingerprint 906 to the discovery agent 548, thus greatly optimizing the patch discovery process by eliminating unnecessary scanning work at the target computer 500.

Discovery Agent

One optional step to decide if a given software program or patch can be installed is by verifying that the necessary hardware, if applicable, is present, and/or the necessary software is present. For example, some programs may require a specific operating system, some programs may require a certain processor. As an example, if an update of Microsoft Word software is to be installed, it is necessary that Microsoft Word software be on the machine. These high-level dependencies are stored, in some versions, in the inventory install block 912 in the patch fingerprint. The information in the inventory install block is generally high level enough that it can be pulled out of the target inventory 920 of the specific target computer 500 stored in the inventory library 918.

In some implementations of the invention the patch fingerprint 906 also includes installation dependency information 912. This, as explained above, is information about the target computer 500 that can be expected to be found in the inventory library, and so can be checked without querying the target computer 500. This includes software that should be present (such as a specific version of a program, a patch, a data file or a driver) a hardware component that should be present, or specific hardware and/or software that shouldn't be present.

If the inventory library does not have an up-to-date inventory for the target computer 500, the discovery agent can be used to scan the target computer 500 for inventory information; it does not necessarily need to also scan simultaneously for signature information. In the preferred implementation, the first time that the discovery agent 548 runs on a given target computer it scans only for inventory information and then loads that information into the inventory library 918; it ignores the patch fingerprint information. At other times when the discovery agent 548 runs it may ignore inventory information and may, rather, be used to look up specific signature information 910 to test for the existence of a specific patch. When the signature block information is looked for, values such as registry entries and INI file values may be inspected for existence, or the actual value may be returned to the repository component 600.

Each Patch fingerprint comprises a signature block 910 and an existence test 908. The patch signature block is a set of information requests, the information itself to be gleaned from a target computer 500 which will then be used to determine if all necessary bug fix and security patches are installed. Examples of patch signature block information include but are not limited to file, hardware, registry and configuration information, a specific file name or directory name, all or part of a path that a file is expected to be found in, a specific version of a file, a created date of a file, a file version, and a specific registry value.

In one implementation the fingerprint library 904 is a SQL database. The patch signatures 910 are extracted from the SQL fingerprint library and then sent to all target computers that meet the dependency criteria for operating system and installed software as specified in the inventory install information 912.

A preferred implementation employs an XML-based request input file. The result file sent back to the update server 528 also employs XML formatting. This result file contains the signature information for the target computer, and may also contain the software and hardware inventory updates. The inventory and signature information sent to the update server can be quite voluminous, and so are compressed in the preferred implementation. The following is a sample patch signature that will gather registry information for Microsoft Outlook as well as the EXEs date and time, and information in the registry:

```
<file componentid="1" reportID="1">
    <name>outlook.exe</name>
    <path></path>
    <version>9.0.2416</version>
    <created></created>
    <size></size>
    <root>HKEY_LOCAL_MACHINE</root>
    <Key>SOFTWARE\Microsoft\Windows\CurrentVersion\App Paths\OUTLOOK.EXE</key>
    <value>Path</value>
</file>
```

Once the discovery agent on the target computer has returned its scan results for the signature, the existence test 908 logic is used by the evaluator 914 to infer whether that particular computer actually has the patch or not. This algorithm minimizes the number of tests that must be done by the evaluator: its sole responsibility is to discover information—allowing the data analysis to be done by the repository component 600 itself. Distributing the workload in this fashion provides a better implementation for scanning and analyzing huge numbers of workstations and servers.

Each existence test is specific to a given patch. A sample existence test might appear as: if registry QQ contains value ZFILEVAL or (if file_Z123.bat was changed on date Dec. 12, 2000 at 11:52 pm and file Z is of size ZFILESIZE) then the patch ZPATCH is present. The preferred embodiment of the patch fingerprint library is an SQL database, but other known or inventive databases can be used.

Note that a patch fingerprint may also contain dependencies to other Finger Print definitions: for example, "MS-023 IIS Vulnerability Fix" patch might hypothetically require the presence of "Microsoft Windows Service Pack 2". This is used to further optimize where the patch signatures are actually sent. These may sometimes be used in the install dependencies info 912 and other times in the signature block 910, depending on circumstances.

In addition, fingerprint definitions 906 are also normally associated with a software package 554 suitable for deployment by the system. Once the need for a particular patch has been established by scanning its signature(s) on all computers within the network it can then be quickly deployed by the administrator by merely selecting the date and time.

In some implementations the downloader 924 regularly checks the patch component database for new patch fingerprints. When a new patch fingerprint is located, it is downloaded into the repository component. The evaluator compares the dependencies needed for the specific patch implementation listed in the install info 912 with each of the target computer 500 specifications listed in the inventory library. Then an update list is created which may identify all of the target computers 500 that need the patch, all of the target computers that don't possess the patch, all of the target computers that can receive the patch, as they have the necessary dependencies, and/or all of the target computers 500 that have already received the patch. This update list may now be used to update the target computers, and/or may be sent to an administrator by a notifier 916.

In some instances of the invention the patch component database is owned by someone other than the target computer 500 owner. Only if this patch update host has given permission to the target computer 500 owner will the downloader be allowed to download the new patch fingerprints into the repository component. The permission may comprise a purchase agreement, a lease agreement, and an evaluation agreement.

If any modifications are made that may be of interest to the administrator, the notifier 916 will send a notification message containing the new patch updates that have become available or the patch-related state changes that have occurred in his network configuration. Notifications can be sent via e-mail, pager, telephony, SNMP broadcast or Instant Message.

Target Computer

In one embodiment, the inventive system comprises three pieces: a target computer 500, an update server 528, and a package computer 548. The target computer 500 has a memory 502, and a network connection 504, which in at least one implementation of the invention is a winsock layer but which can also be a browser. A socketless protocol can be implemented, or any other known or inventive network connection can be used. The update server 528 has a memory 530 that may include an optional backup storage 534, and a network connection 532 which may be a browser. The package computer 567 has a memory 550, and a network connection 552 which may be a browser. FIG. 5 shows one target computer 500 for convenience but there may be many more in a given embodiment. Likewise, one update server 528, and one package computer 567 is shown for convenience, the invention may only require one but also support two or more. In a preferred embodiment these pieces are all separate computers, but they can be virtual pieces of the same computer, such that they appear to be distinct. For example, the "package computer" piece may reside on a different partition of the update server.

The target computer contains a network connection 544, which may be protected from the outside by a firewall 526 as is discussed above. Different target computers within a network may run on different platforms; for instance, some may be Windows machines, some Unix machines, etc. The same update server 528 can be used for all the platforms, or different update servers 528 can be specified by platform type, or the update servers 528 can be assigned to target computers 500 using a different schema.

The target computer 500 also contains an update agent 508. The update agent is a software component that can be installed using the inventive method on multiple machines at a time or, in some embodiments of the system, can be installed in the traditional manner on the target computer 500. The update agent 508 knows how to perform two basic tasks: 1) how to contact an update server 528 to retrieve its list of tasks from its update list 536 and 2) how to start the tasks in the task list received.

Update Agent

The update agent of target computer 500 contacts the update server 528 to determine if there is work for the agent 508 to do. The update server 528 determines this by analyzing an agent's update list queue 536. This update list 536 contains, at a minimum, a software location reference 538, but can also contain a date 540 that indicates the earliest date that the software package 554 can be installed, and multiple software location references, if the same software package is available from multiple locations. The types of software 554 that can be updated comprise, without restriction, patch files 556 that update a currently installed software application on the target computer, data files 558, script files 562, new application files 564, executable files, 560 and updates to the update agent file itself 566.

When the update agent discovers an entry on its associated update list 536, with an appropriate date 540, if any, the installer 510 initially checks to see if a copy of the software package already exists in memory 530 on the update server 528. If found, it then downloads the software package directly from the update server. This situation may arise when a previous target computer 500 has requested the software package 554 from the update server 528.

If the software package is not found, the installer 510 then attempts to download the update directly from the package computer location given in the software location reference 538 to the target computer memory 502 using its network connection. This will be possible if there is no firewall 526, or if the update server can browse the package computer location 548.

When an administrator builds a package that instructs the update agent 508 to retrieve the files from a "non trusted" source such as the package computer 567, the installer 510 will be unable to retrieve the resource directly. However, the update agent can ask the update server 528 to retrieve the package. In some implementations there are multiple update servers and the update agent 508 decides which one of them to access using some predetermined criterion. Examples include selecting the first update server 528 that is available, selecting the least-busy update server, selecting the update server that is "closest" in networking terms, and so on.

In one implementation of the invention, if the update server 528 can reach the offsite package computer 567, it reports to the update agent 508 that it can reach the resource and estimates the time the retrieval will take. This estimate informs the agent how long it should wait before the requested resource is available. If the calculation estimation is not exact, as it probably will not be because of internet traffic fluctuations and server response time variances, then if the agent asks for the resource again the update server will provide another wait time length and the agent will wait once again. This cycle will repeat until the update server 528 has the resource available in memory and can deliver it to the agent upon the next request.

As a particular software package could be requested multiple times by different agents 508, in one implementation of the invention, the update server 528 will store this resource in a local cache 530 from which it can fulfill additional retrieval requests. To prevent the update server 528 from filling up all its available memory with old software packages, one embodiment stores the number of times the package is accessed and the time of the latest access for the stored software package and estimates a "time to live" amount of time for that resource to stay in its cache. A separate task running in the update server 528 will check periodically for resources that have "outlived" their usefulness and recover the update host's storage resources by deleting the stored software package update from the cache 530.

In one embodiment the update server will make the packages available to the list of agents one at a time. If an agent 508 or an outcome finder 512 reports that the application of the patch failed, or if the patch puts the agent's target computer 500 in such a state that it can no longer communicate with the update server, then the update server will suspend the rollout automatically on the administrator's behalf. At this point, the administrator, or some other designated person can be notified 516 of the outcome.

An outcome finder 512 determines if the software package installation was successful and then communicates its finding to the update server 528. If the outcome is unsuccessful, as discussed above, a restorer 514 places the target computer in an acceptable non-updated state. The outcome finder 512 does not necessarily monitor only the actual software installation; rather it can be set up to watch uses of the software that was patched, the entire target computer, and/or computers that are networked to the target computer, for some designated period of time. The outcome finder can also have different levels of success. For instance, the installation itself (file copying) can be considered a low level of success, while the target computer not misbehaving for a period of time thereafter can be considered a higher level of success, with different actions taken according to the success level.

Some embodiments store a backup 506, 534 of a target computer 500 or a portion thereof before installing the software package on the target computer 500. Sometimes the backup is stored 534 on the update server, sometimes on the target computer 506, 500 which is having its software updated, and sometimes it is stored offsite at a repository site 600. When the outcome finder 512 reports a problem with a software installation, the restorer 514 can use the backup 534 to return the target computer to a non-updated state.

In one embodiment of the invention, the update server 528 waits for a confirmation of a successful installation (by the outcome finder 512, or by another known or inventive contact method) before the next target computer 500 has the software location reference 538 to the package placed on its update list 536 at the update server 528. In a preferred embodiment, when an installation finishes, an administrator is notified 516 of the results by email 518, pager 520, voice mail 522, SNMP notification 568, instant messaging 570, beeper, fax or by some other means. If the installation failed, the specific machine that the installation failed on may be identified. In some embodiments, after a default or user-defined number of successful installations, the package is made available to more than one user at a time.

These update lists 536 facilitate the administrator's designation of pre-build packages, or custom build packages, to be delivered or rolled-out to managed workstations or clients and managed servers, which we refer to as target computers 500. When these packages are to be made available, updates are scheduled by the administrator to be performed by the invention; this may automate a previous task requiring the administrator's visit to a client to install a patch or service pack.

The update agent 508 may be aware of the platform it is operating upon, and may be programmable or scriptable to perform actions on behalf of the administrator. In one implementation these features are exposed to the administrator through Package Builder wizards. A "software package" can be any combination of files, service packs, and scripts. This presents an opportunity for the administration of remote machines, since almost anything that could be performed at a remote machine can be accomplished via the agent acting on behalf of the administrator.

One implementation of the invention allows scripts 562 to be run before (pre-install) and after (post-install) the package installation. An example of a pre-install script may be: (in pseudo-code)

Check for available disk space.

If disk space available greater than ValueX (where ValueX=room needed for install plus a buffer) then start the install.

Else, alert outside administration that an error has occurred, and terminate.

An example of an post-install script (again, in pseudo-code):

If install was successful, then notify an outside source that install successful.

If install was unsuccessful, then notify an outside source that install was unsuccessful.

Figure 6:
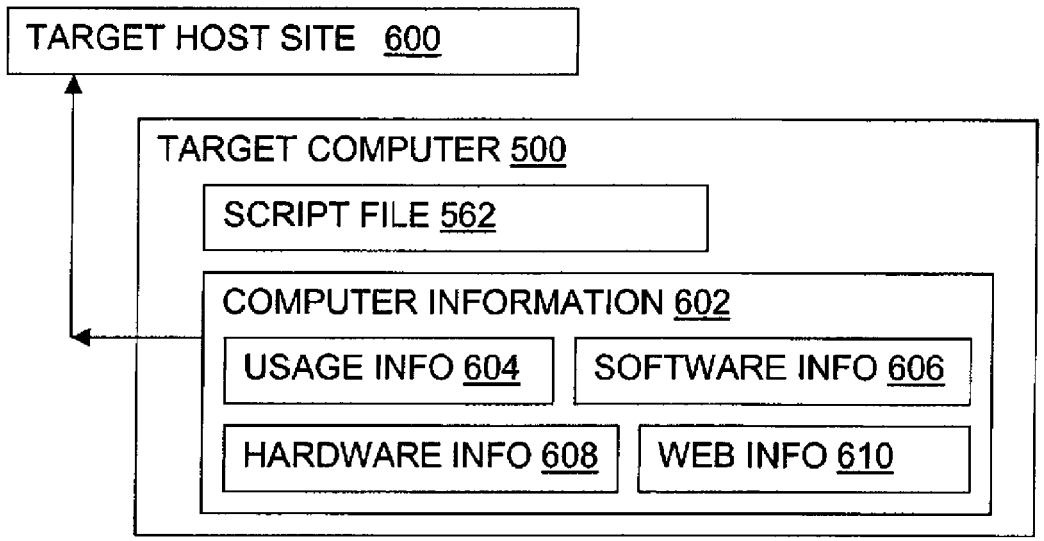
FIG. 6 is a diagram further illustrating systems according to the present invention.
Figure 7:
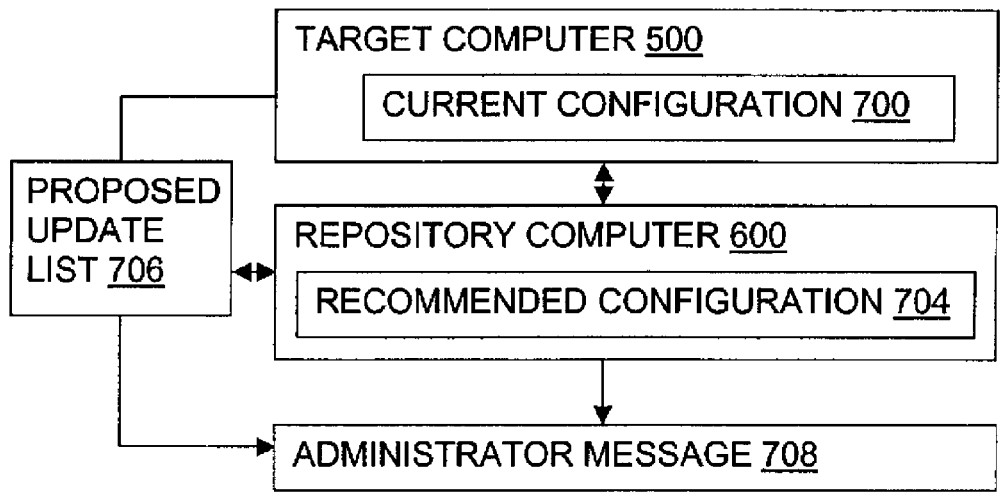
FIG. 7 is a diagram further illustrating systems according to the present invention.

Referring now to FIGS. 6 and 7, the network 200 may include many different sorts of target computers, each with an agent that may be specifically constructed for the specific target platform. For example, a network running Microsoft Windows PCs, Apple computers, and UNIX computers, may have three types of agents. This provides a benefit in that the agent is capable of surveying its target computer and reporting this computer information 602 to the update server 528 and/or to a separate repository site 600 for storage. In some instances of the system, a discovery agent 548 is provided which performs the scan, as discussed elsewhere. In other instances the scan is performed by the update agent 508, or a downloaded script file 562. Hardware configurations 608, software configurations 606, information about the usage of various hardware and software components 604, web sites visited, emails sent and received 610, can all be sent to the offsite location 600. Once this information is available at the update server, an administrator can view the entire managed network from one place.

When the inventive system is implemented on an existing network, the discovery agent 548 may perform a survey of the software in existence at least on the target computer 500, with existing software configurations 700 detected and stored within the repository site 600 memory. Some systems may survey the entire network 200. When updates are called for, the system knows which ones are needed without needing to resurvey the network machines to check their current status.

A recommended configuration 704 for the target computer 500 is placed on the update server 528 or on the repository site 600. The recommended configuration may be decided on in many ways, either inventive or known to those of skill in the database arts, for example, by hardware configuration, by software configuration, by type of computer, by last package update, and so on. The discovery agent 548 then compares the current 700 and recommended 704 configurations and prepares a proposed list of updates 708 for the target computer 500. The update list may include service packs for installed software, previously uninstalled software, updated data files, and the like. The process of preparing the suggested list may take into account not only the current software configuration but also information such as the hardware configuration 608, and how often a particular program, data file, etc. is accessed 604, as well as other information that is known to one of skill in the art. An administrator may be automatically notified of the update list.

Assuming that the target computer current configuration 700 generates a proposed update list 706, an administrator may be automatically notified 708. At this point, the computer use may be restricted until the new target computer is updated at least partially, until the administrator gives permission, or until some other inventive or known condition is met. This proposed update list 706 may also be used to define an update list 536 used to actually update the computer, as explained elsewhere.

Packages are composed of modules representing files, e.g., software files or data files, and scripts, which are sequences of actions to take upon files in the package. In some embodiments of the invention, a human administrator receives notice of the availability of new software patches. In other embodiments, the notices are sent directly to the offsite update server 528 which decides when to roll them out. The offsite update server can be configured to store in permanent memory the packages that have already been stored on each target computer. When a new package becomes available, or during the installation of an existing package, existing evidence of the software packages that need to be installed, as well as information about previous installations, is available in some embodiments at the offsite update server 528, and in other instances at the repository site 600.

The packages that are to be updated do not need to be owned by the target computer 500 user to receive access to it. In one embodiment of the system, the software package is owned by a third party which leases the software to the user. In another embodiment, the software package is owned by the update server user who then leases and provides access to the software package to the target computer 500 user.

Implementation Notes

Additional details regarding particular embodiments are provided below. These implementation details are provided in order to err—if errors are made—by including too much information rather than including too little. Applicants should not be penalized for being so forthcoming. In particular, the inclusion of details should not be viewed as an assumption or admission that those details, or similar details, or a similar level of detail, are actually required to support the claims ultimately granted. Nor should the inclusion of particular implementation details be misinterpreted by treating as inventors people who simply implemented inventive ideas conceived by others.

Agents
   Microsoft Windows Agents
   NetWare Agent
   Linux Agent
   Java Agent Package Construction/Package Maintenance An administrator uses this module to create a package for distribution through the designated Update agents. This package can be a file distribution or a software package, allowing for more flexibility when updating existing installed software, installing new software, file-replication, etc. throughout the designated managed machines. Below are the steps for proper package creation:

1. Enter the Package Specifications

Package Name—Labels the package throughout the updating process.

Package Type—When Software Package is selected in the Software Package routines, after the source files for the package are placed in their proper destination sequence, the administrator may immediately finish the package creation (using pre-designated default values for the rest of the options). File Distribution requires the administrator to complete all steps in the package creation routine.

Operating System—Choose the Operating Systems to which the package can be rolled out. Currently, you may select one operating system per package. These include: Linux, NetWare, Windows 2000/NT, Windows NT, Windows 95/98/ME (Optional) Import—Imports a previously exported package. This option is useful for creating the same package for multiple operating systems.

2. Add the Source

Add File—Adds a file from your local workstation or network location that is reachable.

Add Dir—Adds a directory from your local workstation or network location that is reachable.

Add URL—Adds a remote file to the package via well-known protocols. The various types of URLs you can add are: Local File—File://, FTP—ftp://, HTTP—http://, Secure HTTP—https://, Anything else you choose as long as the agent recognizes the protocol (this field is editable).

Remove—Removes a file from the package.

Properties—Shows the details of how each file is stored within the update server. Also allows for multiple sources in case one source is busy or slow (due to net lag for example). The agent automatically tries the other sources.

Import File—imports a specific list of files from a previously exported package.

3. Add the Destination

Target Computer—A hierarchical tree view of the package file destination. The various default directories shown depend on the operating system for which this package is targeted. The package always displays in the same directory path from which the source files were originally imported (see Step 2). To move the files around simply highlight the directory or file and drag it to its new location.

Properties—if the directory where the files should install is not displayed, highlight a file and click the Properties button. This displays the base information of where the source file is coming from and an entry field for the destination. Type the new location and click OK and your changes are shown (this may take a while because the paths are reconnected for large package file numbers).

Export File—Exports a base package to a file (source and destination information) for use later in an import function.

4. Dependencies

Left Column—A list of existing packages that are ready for rollout (operating system dependent). For example, if you have a Java-based package that must be rolled out to numerous computers, you would select the specific JDK package as your dependency so that the JDK is installed prior to the current package.

Right Column—The packages placed here (by using the arrow buttons) are the dependencies for your package. Use the + and − buttons to arrange the dependencies in order of importance (most important being the first dependency). Dependencies are processed before your package.

Asset—if the dependencies are not found the package fails to install. For example, if a Microsoft Office 2000 SRI package is created, its Asset dependency is Microsoft Office 2000 which must already be installed.

Install—if the dependencies are not found, install them prior to installing the current package. Using the above example, if MS Office 2000 is not found, it is installed prior to installing the SRI package.

5. Package Settings

Backup—Backs up any existing package files found on the destination machines. The editable pull-down list contains the most common directories for the operating system in question. If your directory is not found just type it into the list.

Confidence Level—The default for all new packages is New. The Confidence Level indicates that this package was tested and its performance has determined its confidence level.

Availability—The default is Available which indicates the package is available for rollouts. Not Available indicates this created package is unavailable for a rollout.

6. Scripts

There are three types of package scripts you can use: Command Line—The contents of this script are executed as a standard command line. This script is sent after the files are copied to their destinations. Pre-Script—The contents of this script are executed prior to the files being copied onto the machine. Post-Script—The contents of this script are executed after the files are copied onto the machine.

7. System Settings

Language—Select the languages for which the package is available. The agent then checks that the language is on the machine and that the package matches before the package is installed.

Processor Type—Select the processor for which the package is available. The agent then checks that the processor is on the machine and that the package matches before the package is installed.

8. Finish—Click Finish to upload the files and assemble the package. When the assembly process ends the button changes from Finish to Done. Click Done to complete the package creation function.

Define a Group/Modify a Group

This module lets an administrator group machines together, making the rollout procedures easier so that a rollout is as easy for one machine as it is for 500 machines.

Additionally, an administrator might group machines according to their function or location to make bandwidth utilization more efficient for their network.

1. Group Name—The label designation for the group.
2. Machine List—Select all the machines this group will include. A machine shows up only after the update agent is installed and registered.
3. Finish—After the machines are placed in the group, the Finish button changes to Done. Click Done to complete the group function.

Schedule a Rollout/View Existing Rollouts

The rollout schedule defines the date and time the packages are made available to the designated machines.
1. Choose a Package
Package Selection List—Choose a package (only one at this time) to install.
2. Choose Machines
Add a Group—This button displays a dialog box showing a list of the available groups. Highlight the groups you wish to deploy then click the OK button.
Remove a Group—Highlight the groups you do not want the package rolled out to, then click the Remove a Group button.
Add a Machine—This button displays a dialog box showing a list of available machines (with registered update agents on them). Highlight the machines to add then click the OK button.
Remove a Machine—Highlight the machines you do not want the package rolled out to, then click the Remove a Machine button.
Rollback—Removes the package just installed and returns the backup (if one was designated). This option is available only via View Existing Rollouts.
Reapply—Re-installs the package.
3. Choose a Rollout Date and Time
Calendar—Choose the date for the rollout installation to occur.
Time—The time on the server when the package is to be rolled out.
4. Choose Bandwidth and Sequencing
Bandwidth—This level determines how much bandwidth on the server downloading of the package will utilize. The minimum value is 30% and the maximum is 100%.
Sequencing—Selecting YES (default value) causes the rollout to go machine by machine throughout the entire rollout process and finish after the last machine is done. If an error occurs anywhere in the rollout process the rollout stops. Selecting NO causes the rollout to install the package on all machines. If an error occurs on one machine, it does not affect the package rollout on another machine.
5. Finish—The rollout is created or updated and is saved after clicking the Done button.

Agent requests will be in the form of HTML Forms using the POST method. Host responses will be well-formed XML 1.0 documents. Most of the returned documents are of such simple structure, a DTD, NameSpace, or Schema will not be included, but they will be syntactically and structurally in compliance with the XML specification. All dates and times are normalized to Coordinated Universal Time (GMT).

This describes the transaction or data flow between the Agent, the requester, and the Host, the Update Service. All Update transactions will be initiated by the Agent, except for the case where the Host will open, send the agent ID and then close an agreed upon port and protocol at the Agent's IP address to effectively 'Ping' or notify the Agent that it should request a list of work from the host regardless of its request schedule.

First Contact

Any Agent needing to converse with the update server 528 service, will always make a request to the designated master site for the /update subdirectory. This subdirectory will be configured to return a '302 Object Moved' and its 'new' location.

As demonstrated in the following example, the agent performs a 'HEAD' request on the/update subdirectory of the www.patchlink.com site.

Head Request—HEAD/Update http/1.1

The Host responds that the object is moved, and the new location can be found at the address provided by the Location: header.

InstallShield Agent Registration

During the physical installation of the 'update agent', the Administrator will be required to enter some information before the agent is installed. The Admin will be required to enter the Host Name or IP Address, the Account Identifier, a GUID (Globally Unique Identifier), and the User Name and Password that was specified when registering. This data will be sent to the host to validate the ability to install the agent software, and to generate an ID for the agent.

Agent TaskList

Once InstallShield has successfully installed the BootStrap Agent software on the computer, it's time for the agent to start working. After the agent resolves the update server 528 host site address, it posts a "TaskList" request. A "TaskList" is a simple list of "Task" items the Admin has scheduled for the Agent to perform.
1. The BootStrap Agent must be able to:
2. Request the initial TaskList.
3. Receive the initial TaskList.
4. Understand the initial TaskList.
5. Download the Full Agent's install file.
6. Run the Agent Install.
7. Report any install problems, if so, continue as instructed.
8. Start the full Agent.
9. Poll for new TaskLists.
10. Understand SoftPkg IDs and dependencies and download them.

Initial "Action Scripts" either by invoking an external Script Engine or by invoking the Script Engine from within the Agent.

The Agent making the initial TaskList request and processing the returned response accomplishes this. For example:

TaksList Request
POST server object_returned_in_firstcontact http/1.1
Content-Type: text/html
Content-Length: 32
Action=TaskList
&AccountID=AF011203-7A09-4b67-A38E-1CB8D8702A50
&AgentID=D7292F2D-CCFE-46dc-B036-3B318C2952E3
&AgentVer=0.0
&LocalTime=20000628010100
&Status=0

In this request, the Agent's Version is 0.0. This indicates to the host that this is a new installation of the agent and that the host should prepare a 'Task' for the agent that downloads the latest versions of the appropriate agent software. In the following response, this is shown as the first 'Task'—TaskID="C1D50120-FF13-11d3-95B5-000629526438".

Whenever there has been a change to the Agent's policy, the host will include the policy data in the "TaskList"—since this is the initial request from the agent, the policy data is included in this response.

LocalTime is just that the Local time (NOT GMT). This allows the server to know exactly what time it is on the Agent machine. Format is in YYYYMMDDHHMMSS.

Status tells the tasklist processor to just return a simple yes or no status if there are tasks to be done.

Status=0 means to return a normal task list. Status=1 means tell the agent if you have tasks to be done. This allows the agent to come in non-SSL and do a quick check.

Agent Soft Package Request

The first task indicates there is a module to be installed. As shown below, the agent requests the detailed installation information from the host:

Soft Package Request

POST server_object_returned_in_firstcontact http/1.1
   Content-Type: text/html
   Content-Length: nnnn
   Action=SOFTPKG
   &AccountID=AF011203-7A09-4b67-A38E-1CB8D8702A50
   &AgentID=D7292F2D-CCFE-46dc-B036-3B318C2952E3
   &AgentVer=0.0
   &TaskID=C1D50120-FF13-11d3-95B5-000629526438
   &PkgID=12340000-1111-0000-0000-000000000000
   &LocalTime=20000628010100

Note that in this instance, the Agent's version is 0.0. This indicates to the host that the package to update the Agent software should be included in the TaskList response. This allows the host to dynamically determine when there is a newer version of the agent software that is available and directs the agent to update itself.

The host puts together an "Open Software Distribution" document that details the information the agent will need to be able to complete the task:

LocalTime is just that the Local time (NOT GMT). This allows the server to know exactly what time it is on the Agent machine. Format is in YYYYMMDDHHMMSS.

Soft Package (All Elements)

A soft package showing all the possible XML components (shows backup).

```
<?xml version="1.0"?>
<!DOCTYPE SOFTPKG SYSTEM "http://msdn.microsoft.com/standards/osd/osd.dtd">
<SOFTPKG xmlns:GX=http://www.patchlink.com/standards/osd/update.dtd
    GX:TaskID="C1D50120-FF13-11d3-95B5-000629526438"
    GX:PkgID="12340000-1111-0000-0000-000000000000"
    Name="12340000-1111-0000-0000-000000000000"
    GX:ReInstall="N" GX:RollBack="N">
<TITLE>Windows NT update agent</TITLE>
<IMPLEMENTATION>
  <OS VALUE="win2k"/>
  <OS VALUE="win98"/>
  <DISKSIZE Value="123456"/>
  <CODEBASE>
    <GX:DIR ModuleID="00000104-0000-0000-0000-000000000000">
      <GX:Destination>
        <GX:URI DateTime="20000415010100">
          <GX:URL>FILE://%TEMP%/</GX:URL>
          <GX:ACL Attrib="RWXHSMA Name="$OTHER"/>
          <GX:ACL Attrib="RWXHSMA" Group="$GROUP"/>
          <GX:ACL Attrib="RWXHSMA" Name="$USER"/>
        </GX:URI>
      </GX:Destination>
    </GX:DIR>
<GX:FILE Expand="N" Overwrite="Y" ModuleID=
"00000100-0000-0000-0000-000000000000">
```

Soft Package Status—Success

The return codes RC and SoftPkgRC are in decimal format. SoftPkgRC denotes the overall completion of the package. Some modules could have been successful (RC=0) but another may have caused the error. If a rollout is attempted with a package that has already been install once then the agent will return (RC=0) for all the modules it installed and return (SoftPkgRC=725003) or 0x000b100b Soft Package already installed.

Upon completion of the task, the agent will update the host with the results:

Request

POST server_object_returned_in_firstcontact http/1.1
   Content-Type: text/html
   Content-Length: nnn
   Action=Status
   &AccountID=AF011203-7A09-4b67-A38E-1CB8D8702A50
   &AgentID=D7292F2D-CCFE-46dc-B036-3B318C2952E3
   &AgentVer=2.0
   &TaskID=C1D50120-FF13-11d3-95B5-000629526438
   &PKGID=12340000-1111-0000-0000-000000000000
   &InstallDate=20000101123456
   &SoftPkgRC=0
   &SoftPkgRCMsg=Success
   &ModuleID=00000100-0000-0000-0000-000000000000
   &RC=0
   &RCMsg=Success File Attributes and ACL's This part describes the GX:ACL element found in GX:Destination (GX:URI) element. The attributes in Update are supplied in to the agent in the Super set form defined below.

The problem with doing basic file attributes is that some file systems blur the boundary between Attributes and ACL's. An attribute is the basic ACL of a file and what is defined here is a small cross platform superset. For instance, Windows NTFS has the Read Only attribute flag but it also has the Read ACL. Therefore, if we are going to make generic attribute flags, then we must expect the meaning to be altered somewhat when used as ACL's. Those on the Unix platform will see no difference, except that like other platforms, you would ignore flags that you do not understand or no defined behavior is listed here.

Three default ACL's are defined and act like basic file attributes; $OTHER, $GROUP, $USER.

On Unix the file system all three of these attribute ACL's would use. However, NT, FAT and NetWare would use only $OTHER for basic file attributes. Any other names in the ACL's element data will be construed as a name

| ACL and Attribute flags | | |
|---|---|---|
| Letter | Short | Definition |
| R | Read | Display the file's data, attributes, owner, and permissions |
| W | Write | Write so the File, append to the file. |
| X | Execute | Run the file (if it's a program or has a program associated with it for which you have the necessary permissions) |
| H | Hidden | Hidden file |
| S | System | System file |

-continued

ACL and Attribute flags

| Letter | Short | Definition |
| --- | --- | --- |
| M | Modify | Read, write, modify, execute, and change the file's attributes. |
| A | Archive | File is ready for Archive |

The XML syntax:
  This denotes an ACL for a User
  <GX:ACL Attrib="RWXHSMA" Name="UserName"/>
  ACL for a Group. Note that $GROUP will always use Group=
  <GX:ACL Attrib="RWXHSMA" Group="GroupName"/>

Soft Package—Rollback
  HTTP/1.1 200 OK
  Connection: close
  Content-Type: text/xml
  Content-Length: nnn

```
<?xml version="1.0"?>
<!DOCTYPE SOFTPKG SYSTEM "http://msdn.microsoft.com/standards/osd/osd.dtd">
<SOFTPKG xmlns GX=http://www.patchlink.com/standards/osd/update.dtd
       GX:TaskID="C1D50120-FF13-11d3-95B5-000629526438"
       GX:PkgID="12340000-1111-0000-0000-000000000000"
       Name="12340000-1111-0000-0000-000000000000"
       GX:ReInstall="N" GX:RollBack="Y">
<TITLE>Windows NT update agent</TITLE>
<IMPLEMENTATION>
   <DISKSIZE Value="432"/>
   <CODEBASE>
       <GX:FILE Expand="N" Overwrite="Y" ModuleID=
"00000100-0000-0000-0000-000000000000">
           <GX:Destination>
              <GX:URI>
                  <GX:URL>FILE ://%TEMP%/</GX:URL>
                  <GX:FILENAME>HelloWorld.txt</GX:FILENAME>
              </GX:URI>
           </GX:Destination>
           <GX:Backup>
              <GX:URI>
                  <GX:URL>FILE://%TEMP%/Backup</GX:- URL>
              </GX:URI>
           </GX:Backup>
       </GX:FILE>
   </CODEBASE>
<IMPLEMENTATION>
</SOFTPKG>
```

This example rolls back the simple file copy with backup shown above. The agent denotes a rollback from the attribute GX:Rollback="Y" in the SOFTPKG element tag.

The GX:Source element tags are not supplied.

The destination MUST contain a filename to restore the backup to. (Note: it is not an error if the backup files do not exist prior to rollback (the destination may not have existed when the package was distributed). It is however, an error if the destination files exists and cannot be deleted prior to the rollback.)

ProxyGet

Sometimes an agent may be installed behind a firewall in such a configuration that the agent is only allowed access to the host site. The agent will detect this case when it tries to retrieve a module for a package that is on the vendor's site. When the agent realizes that it cannot establish communications with a standard HTTP get, it can ask the host to retrieve the file on the agent's behalf by using a "ProxyGet" request—as described below:

Request
  POST server_object_returned_in_firstcontact http/1.1
  Content-Type: text/html
  Content-Length: nnn
  Action=ProxyGet
  &AccountID=AF011203-7A09-4b67-A38E-1CB8D8702A50
  &AgentID=D7292F2D-CCFE-46dc-B036-3B318C2952E3
  &AgentVer=2.0
  &URL=http://www.Microsoft.com/hotfix/Q12345.exe ProxyGetStatus—Request
  POST server_object_returned_in_firstcontact http/1.1
  Content-Type: text/html
  Content-Length: nnn
  Action=ProxyGetStatus
  &AccountID=AF011203-7A09-4b67-A38E-1CB8D8702A50
  &AgentID=D7292F2D-CCFE-46dc-B036-3B318C2952E3
  &AgentVer=2.0
  &RefID=107045CF06E011D28D6D00C04F8EF8E0

GetRequest
  POST server_object_returned_in_firstcontact http/1.1
  Content-Type: text/html
  Content-Length: nnn
  Action=Get
  &AccountID=AF011203-7A09-4b67-A38E-1CB8D8702A50
  &AgentID=D7292F2D-CCFE-46dc-B036-3B318C2952E3
  &AgentVer=2.0
  &RefID=107045CF06E011D28D6D00C04F8EF8E0

HTTP Get—Request
  GET/download/Q12345.EXE http/1.1

Bandwidth Utilization—Range Specified Get Request

HTTP/1.1 allows a client to request that only part (a range of) the response entity be included within the response. HTTP/1.1 uses range units in the Range and Content-Range header fields. An entity may be broken down into subranges according to various structural units.

range-unit=bytes-unit.vertline.other-range-unit
  bytes-unit "bytes"
  other-range-unit=token The only range unit defined by HTTP/1.1 is "bytes". HTTP/1.1 implementations may ignore ranges specified using other units. HTTP/1.1 has been designed to allow implementations of applications that do not depend on knowledge of ranges.

Since all HTTP entities are represented in HTTP messages as sequences of bytes, the concept of a byte range is meaningful for any HTTP entity.

Byte range specifications in HTTP apply to the sequence of bytes in the entity-body (not necessarily the same as the message-body). A byte range operation may specify a single range of bytes, or a set of ranges within a single entity.

When the administrator has selected Bandwidth Utilization features, by specifying them in the agent's policy data, the agent will make 'Range' specified Get requests rather than simple Get requests.

*Consider the following Agent Profile:

```
<Policy IntervalType="S" Interval="60" Start="000000" End="060000"
   Retries="3" BackOff="10%" AlwaysUseProxyGet="Y"
   FailAction="Stop" UDPPort="1234" TCPPort="1234"
   KeepAliveConns="Y"
   DownloadRestartable="Y" DownloadChunkSize="1024"
   DownloadWaitSchedule="S" Download WaitInterval="10"/>
```

The following shows a request for the first 1024 bytes of the Q12345.Exe file, and the host's response:

Request

GET/download/Q12345.EXE http/1.1

Range: bytes=0-1023

ProxyGet Request

POST server_object_returned_in_firstcontact http/1.1

Content-Type: text/html

Content-Length: nnn

Action=Get

&AccountID=AF011203-7A09-4b67-A38E-1CB8D8702A50

&AgentID=D7292F2D-CCFE-46dc-B036-3B318C2952E3

&AgentVer=2.0

&RefID=1107045CF06E011D28D6D00C04F8EF8E0

&RangeBytes=0-1023

| Response XML Elements | |
|---|---|
| Element | POLICY |
| Attributes | IntervalType - type of time period<br>S = Seconds<br>M = Minutes<br>H = Hours<br>Interval - Number of time periods that agent should check host for Tasklist.<br>Start - The time of day the agent should start running and checking for work to do (GMT).<br>Stop - The time of day the agent should stop running and checking for work to do (GMT).<br>Retries - The number of times to retry a request before applying the Backoff amount.<br>BackOff - the amount of IntervalType time to added to the Interval after a failed contact with the host. This may be expressed as a percentrage by appending the percent sign (%). UDPPort- {nnn}<br>UDP port number used to wake up the Agent.<br>TCPPort - {nnn} TCP port number used to wake up the Agent.<br>TraceLevel - OFF = 0, INFO = 1, DETAILED = 2, DEBUG = 3<br>PurgeInterval Type - type of time period (see IntervalType)<br>PurgeInterval - Number of time periods (PurgeIntervalType) that the agent should scan backups and purge those with a time older than the purge interval. |
| Child of | TASKLIST |
| Parent of | |

| | |
|---|---|
| Element | TASK |
| Attributes | TaskID - unique task identifier.<br>PkgID - The package identifier to be acted upon. |
| Child of | TASTLISK |
| Parent of | |

Discovery Agent SML Tags

<name>tag—This is the name of the file you want to search for.

<path>tag—Very versatile. This is the path you want to search for the file in.

<Version>tag—This is the version of the file you are looking for.

<created>tag—This is the date the file was created.

Example <version>> May 30, 2001 12:01:04 PM</version>

Note: This exact date format is preferred.

<Size>tag—This is the size of the file you are looking for. Note: Cannot due < or >

<root>tag—This is the root key to look for the registry entry in.

<Key>tag—This is the key in the registry you are looking for.

<value>tag—this is the value in the key you are looking for.

<Data>tag—this is the data you expecting to find in that key.

<class>tag—You can specify any valid WMI class that makes sense. example win32_services <searchfield>—This is the field that will best determine what wmi entries to look at.

<searchvalue>—This is the value that will best determine what wmi entries to look at.

<checkfield>—This is the field to look in to get the value you are expecting to get.

<checkvalue>—This is the value you are expecting to find.

Example of the <registry> section of the input file.

```
<registry componentid"" reportID="">
   <root> </root>
   <key> </key>
   <value> </value>
   <data> </data>
</registry>
```

Patch Fingerprint Signature Example

```
<report reportid="22">
   <file componentid="1" reportID="1">
      <name>outlook.exe</name- >
      <path></path>
      <version></version- >
      <created></created>
      <size>57393</size>
      <root>HKEY_LOCAL_MACHINE<- /root>
      <Key>SOFTWARE.backslash.Microsoft.backslash.Windows\
   CurrentVersion/App
Paths\OUTLOOK.EXE</key>
      <value>Path</value>
   </file>
</report>
```

The Above example will find the outlook Path from the registry and then will validate its size.

Summary

The invention provides systems, methods, and configured storage media for assuring that software updates are needed, and that the computers have the necessary software and hardware components, then updating the software across a network with little or no need for human oversight, without requiring copies of the software patches on an administrative machine on the network whose clients are being updated, and which removes the updates from the affected machines, leaving them in a usable state when a problem is discovered during installation or after installation with an installed patch.

As used herein, terms such as "a" and "the" and item designations such as "update server" are inclusive of one or more of the indicated item. In particular, in the claims a reference to an item means at least one such item is required. When exactly one item is intended, this document will state that requirement expressly.

The invention may be embodied in other specific forms without departing from its essential characteristics. The described embodiments are to be considered in all respects only as illustrative and not restrictive. Headings are for convenience only. The claims are part of the specification which describes the invention. The scope of the invention is, therefore, indicated by the appended claims rather than by the foregoing description. All changes which come within the meaning and range of equivalency of the claims are to be embraced within their scope.

What is claimed is:

1. A system comprising:
   (a) a package computer having a plurality of patch fingerprints;
      (i) wherein the plurality of patch fingerprints includes at least a first patch fingerprint and a second patch fingerprint, different than the first patch fingerprint;
      (i) wherein at least the first and second patch fingerprints each comprises at least one Extensible Markup Language (XML) metadata query, wherein the first patch fingerprint includes a first XML metadata query, and wherein the second patch fingerprint includes a second XML metadata query, different than the first XML metadata query;
      (ii) wherein at least the first and second patch fingerprints are both associated with a specific software update;
   (b) an update server in communication with the package computer;
      (i) wherein the update server stores at least the first and second patch fingerprints of the package computer;
      (ii) wherein the update server is located remote from the package computer; and
   (c) a discovery agent configured to separately interact with both the first XML metadata query and the second XML metadata query to produce first target computer information relating to the first target computer;
   wherein the system is configured to:
      (A) send the first XML metadata query and the second XML metadata query of the first and second patch fingerprints from the update server to the discovery agent to gather the first target computer information;
         (I) wherein the first target computer information is related to at least registry information, software presence information, and software version information relative to the first target computer;
         (II) wherein a first portion of the first target computer information is associated with the first patch fingerprint and the first XML metadata query;
         (III) wherein a separate second portion of the first target computer information is associated with the second patch fingerprint and the second XML metadata query;
      (B) determine, at the update server based on the first target computer information, whether the specific software update is both applicable to and absent from the first target computer;
         (i) wherein the determination step comprises:
            (1) evaluating the first portion of the first target computer information to determine the applicability of the specific software update to the first target computer; and
            (2) if the specific software update is applicable to the first target computer, then evaluating the second portion of the first target computer information to determine the presence or absence of:
               (A) the applicable files;
               (B) the applicable registry keys; and
               (C) the applicable configuration information of the specific software update;
   wherein the system is configured to, based on the determination (B), download the specific software update to one of (i) the update server and (ii) the first target computer.

2. The system of claim 1, wherein the specific software update is one of patch files, data files, script files, new application files, and executable files, or any combination thereof.

3. The system of claim 1, wherein the update server is configured to:
   monitor the package computer for a new patch fingerprint; and
   receive the new patch fingerprint from the package computer.

4. The system of claim 1, wherein the first target computer information is contained in a results file, wherein the results file is in an XML format, and wherein the results file is stored at the update server.

5. The system of claim 1, further comprising:
   an update task list located on the update server;
      wherein the update server is configured to review the update task list for a target computer that has not received the specific software update and, if one is found, add an update task identifier for that target computer to the update task list.

6. The system of claim 5, further comprising:
   a monitor configured to monitor the installation of the specific software update on the first target computer;
   wherein, if the monitor determines that the installation of the specific software update was successful, the update server reviews the update task list for a target computer that has not received the specific software update and, if one is found, adds an update task identifier for that target computer to the update task list.

* * * * *